(12) United States Patent \
Kukuczka et al.

(10) Patent No.: US 12,636,989 B2 \
(45) Date of Patent: *May 26, 2026

(54) ASSEMBLY FOR PROVIDING A FASTENING POSSIBILITY FOR A VEHICLE COMPONENT

(71) Applicant: ILLINOIS TOOL WORKS INC., Glenview, IL (US)

(72) Inventors: Marek Kukuczka, Istebna (PL); Zsolt Wilke, Bad Mergentheim (DE); Andreas Rudolf, Eibelstadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 312 days.

This patent is subject to a terminal disclaimer.

(21) Appl. No.: 18/263,032

(22) PCT Filed: Jan. 26, 2022

(86) PCT No.: PCT/US2022/013924 \
§ 371 (c)(1), \
(2) Date: Jul. 26, 2023

(87) PCT Pub. No.: WO2022/164919 \
PCT Pub. Date: Aug. 4, 2022

(65) Prior Publication Data \
US 2024/0084836 A1 Mar. 14, 2024

(30) Foreign Application Priority Data

Jan. 27, 2021 (DE) ..................... 10 2021 101 835.8 \
Mar. 22, 2021 (DE) ..................... 10 2021 107 072.4 \
(Continued)

(51) Int. Cl. \
*B60N 3/02* (2006.01) \
*F16B 5/06* (2006.01) \
(Continued)

(52) U.S. Cl. \
CPC ............ *B60N 3/026* (2013.01); *F16B 5/0642* (2013.01); *F16B 21/02* (2013.01); *F16B 21/065* (2013.01); *B60R 21/217* (2013.01); *F16B 21/086* (2013.01)

(58) Field of Classification Search \
CPC ... B60N 3/026; B60R 13/0206; B60R 21/217; F16B 19/1081; F16B 21/086; \
(Continued)

(56) References Cited

U.S. PATENT DOCUMENTS

| | | | | | |
|---|---|---|---|---|---|
| 5,560,575 | A | * | 10/1996 | Krysiak | .............. F16B 19/1081 248/222.12 |
| 5,658,110 | A | * | 8/1997 | Kraus | ................... F16B 21/086 411/908 |

(Continued)

FOREIGN PATENT DOCUMENTS

| | | |
|---|---|---|
| CN | 101578204 A | 11/2009 |
| CN | 103707790 A | 4/2014 |

(Continued)

OTHER PUBLICATIONS

International Bureau, Notification Concerning Transmittal of International Preliminary Report on Patentability issued Jul. 31, 2023 in corresponding PCT Application No. PCT/US2022/013924, 9 pages.

(Continued)

*Primary Examiner* — Jason S Morrow \
(74) *Attorney, Agent, or Firm* — THOMPSON HINE LLP

(57) ABSTRACT

An assembly for providing a fastening possibility for a vehicle component to a body component is configured as a torsion clip and includes a connecting element and a retaining element. The assembly is transferable from a pre-assembly or delivery state into a prefixation state, wherein, in order to transfer the assembly from its pre-assembly or delivery state into its pre-fixation state, a torque is exerted on (Continued)

the retaining element in such a way that the retaining element is twisted relative to the connecting element in order to enable passage of a retaining region of the retaining element through a fastening opening of the body component.

15 Claims, 24 Drawing Sheets

(30)     Foreign Application Priority Data

Jun. 28, 2021    (DE) ..................... 10 2021 116 652.7
Oct. 12, 2021    (DE) ..................... 10 2021 126 414.6

(51) Int. Cl.
| | |
|---|---|
| *F16B 21/02* | (2006.01) |
| *F16B 21/06* | (2006.01) |
| *B60R 21/217* | (2011.01) |
| *F16B 21/08* | (2006.01) |

(58) Field of Classification Search
CPC ...... F16B 21/065; F16B 5/0642; F16B 21/02;
                                     F16B 19/081
USPC ......................................................... 24/297
See application file for complete search history.

(56)     References Cited

U.S. PATENT DOCUMENTS

| | | | |
|---|---|---|---|
| 5,697,140 | A | 12/1997 | Crotty, III |
| 6,419,307 | B1 | 7/2002 | Maruyama et al. |
| 6,923,407 | B2 | 8/2005 | Takcuchi |
| 7,103,939 | B2 * | 9/2006 | Belchine, III ......... B60N 3/023 |
| | | | 16/412 |
| 7,237,995 | B2 * | 7/2007 | Randez Perez ..... F16B 19/1081 |
| | | | 411/48 |
| 7,308,736 | B2 | 12/2007 | Nakazato |
| 7,753,634 | B2 | 7/2010 | Nakazato |
| 8,495,802 | B2 * | 7/2013 | Okada ................. B60R 13/0206 |
| | | | 24/453 |
| 8,657,106 | B2 | 2/2014 | Trapp et al. |
| 8,661,622 | B2 | 3/2014 | Takai et al. |
| 8,695,177 | B2 * | 4/2014 | Kato ................... F16B 21/065 |
| | | | 24/297 |
| 9,217,453 | B2 | 12/2015 | Masuda |
| 9,440,596 | B2 | 9/2016 | Huelke et al. |
| 9,550,441 | B2 | 1/2017 | Aoyama et al. |
| 9,889,783 | B2 * | 2/2018 | Yang ..................... B60N 3/026 |
| 9,914,408 | B2 | 3/2018 | Dickinson et al. |
| 10,336,265 | B2 | 7/2019 | Dickinson et al. |
| 10,710,331 | B2 | 7/2020 | Kameda et al. |
| 10,759,356 | B2 | 9/2020 | Lee et al. |
| 10,913,402 | B2 | 2/2021 | Otsuka |
| 11,351,901 | B1 | 6/2022 | Kozu et al. |
| 11,773,887 | B2 | 10/2023 | Dickinson et al. |
| 12,110,917 | B2 * | 10/2024 | Leidig ................... F16B 21/086 |
| 12,385,513 | B2 * | 8/2025 | Matthes ............... F16B 5/0664 |
| 2006/0049651 | A1 * | 3/2006 | Selvini ............... B60R 13/0212 |
| | | | 296/214 |
| 2016/0040705 | A1 * | 2/2016 | Peter ...................... F16B 21/02 |
| | | | 403/348 |
| 2023/0158650 | A1 | 5/2023 | Shin et al. |
| 2024/0026915 | A1 * | 1/2024 | Kukuczka ............ F16B 21/065 |
| 2024/0084836 | A1 * | 3/2024 | Kukuczka ............. B60N 3/026 |
| 2025/0115176 | A1 * | 4/2025 | Kukuczka ............. B60N 3/023 |

FOREIGN PATENT DOCUMENTS

| | | |
|---|---|---|
| CN | 106286508 A | 1/2017 |
| DE | 102006032943 B4 | 10/2014 |
| DE | 102017209714 A1 | 12/2018 |
| DE | 102021203183 A1 | 10/2022 |
| DE | 102011112449 B4 | 5/2023 |
| DE | 102012024041 B4 | 8/2023 |
| DE | 102022110047 A1 | 10/2023 |
| EP | 1084908 A2 | 3/2001 |
| EP | 1461536 B1 | 9/2005 |
| EP | 1880898 A3 | 2/2008 |
| EP | 1912824 B1 | 1/2010 |
| EP | 2016293 B1 | 3/2010 |
| EP | 2003346 B1 | 2/2012 |
| EP | 2542118 B1 | 4/2014 |
| EP | 2759443 A4 | 8/2015 |
| EP | 2233755 B1 | 4/2016 |
| EP | 3008352 A1 | 4/2016 |
| EP | 2481935 B1 | 8/2016 |
| EP | 2564167 B1 | 12/2016 |
| EP | 2660098 B1 | 2/2017 |
| EP | 3091269 B1 | 9/2017 |
| EP | 2943693 B1 | 5/2018 |
| EP | 2921346 B1 | 6/2018 |
| EP | 3408134 B1 | 11/2019 |
| EP | 3696428 A1 | 8/2020 |
| EP | 3491258 B1 | 11/2020 |
| EP | 3779216 A1 | 2/2021 |
| EP | 3707393 B1 | 10/2021 |
| EP | 3312050 B1 | 3/2022 |
| EP | 3730808 B1 | 11/2023 |
| EP | 3726071 B1 | 2/2024 |
| EP | 3775581 B1 | 3/2024 |
| FR | 3038019 A1 | 12/2016 |
| FR | 3082899 B1 | 11/2020 |
| GB | 2461111 B | 6/2010 |
| KR | 101765631 B1 | 8/2017 |
| WO | WO 2014160541 A1 | 10/2014 |

OTHER PUBLICATIONS

International Searching Authority, International Search Report and Written Opinion issued in corresponding PCT Application No. PCT/US2022/013924 dated Jun. 22, 2022, 14 pages.

* cited by examiner

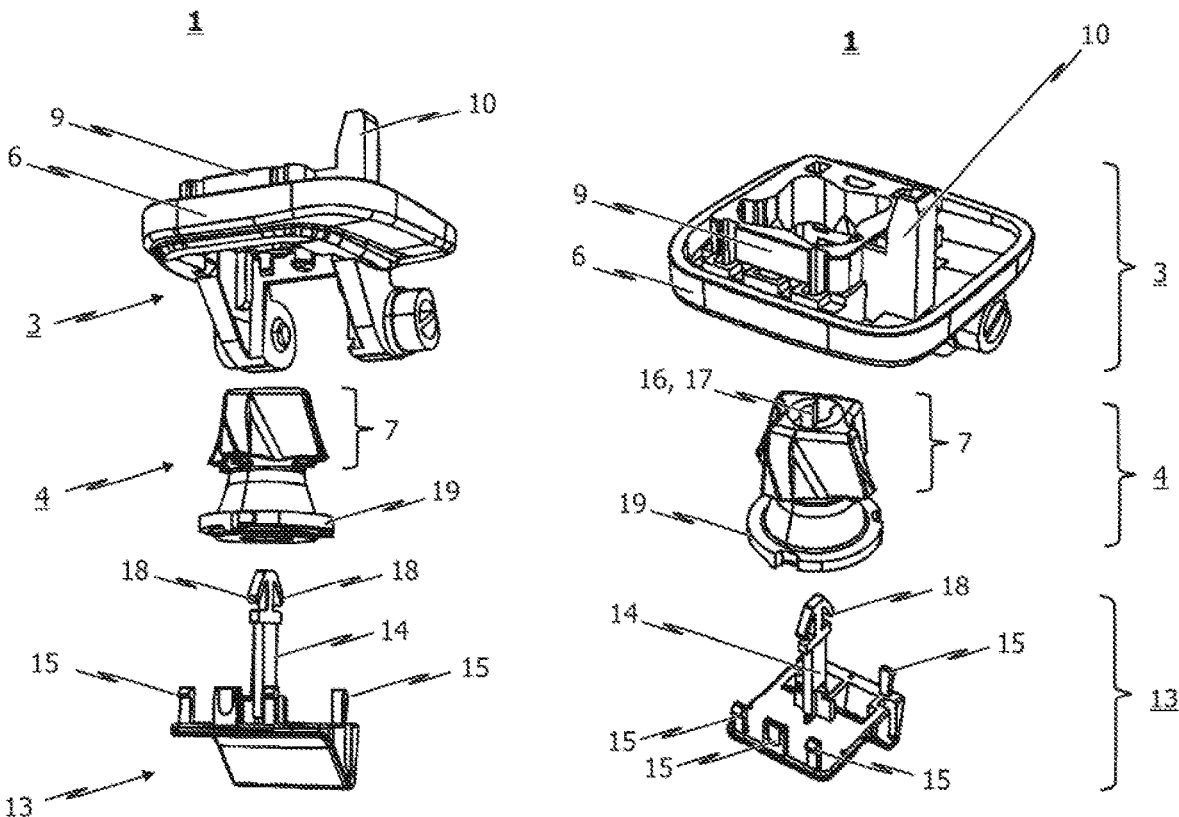
FIG. 4                    FIG. 5

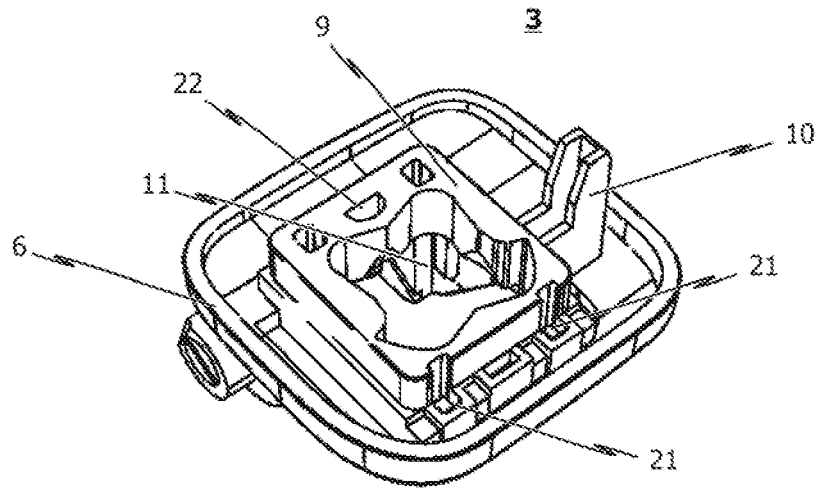
_FIG. 8_
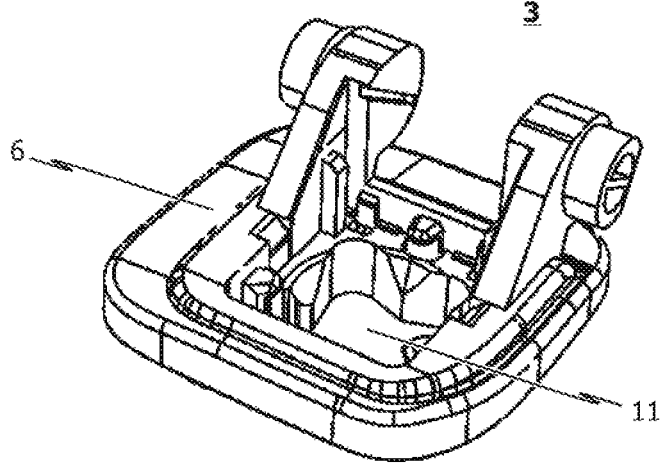
_FIG. 9_

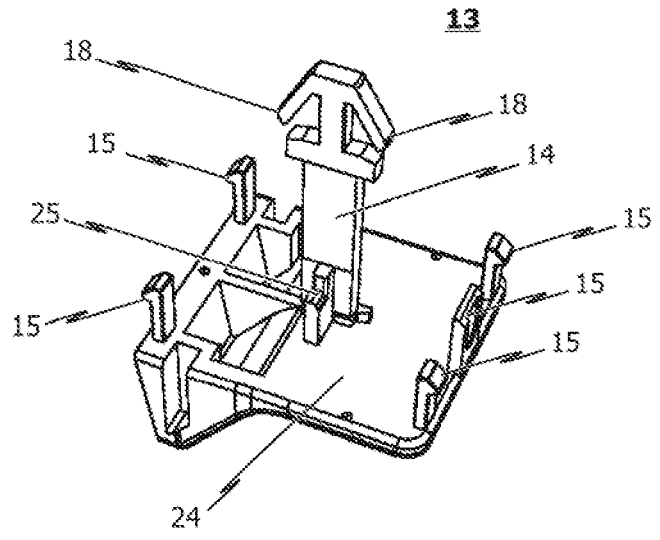
_FIG. 12_
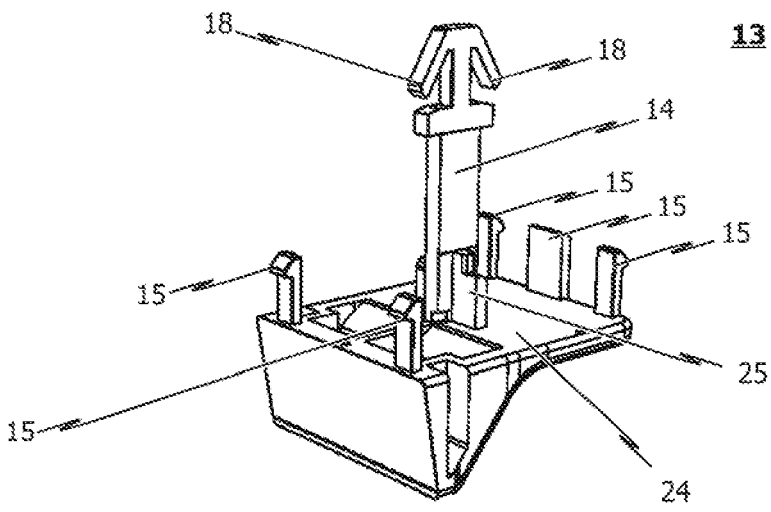
_FIG. 13_

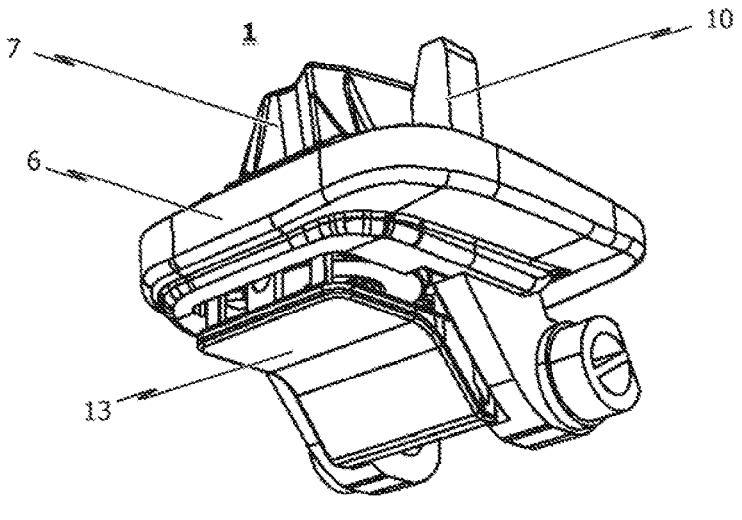
*FIG. 19*
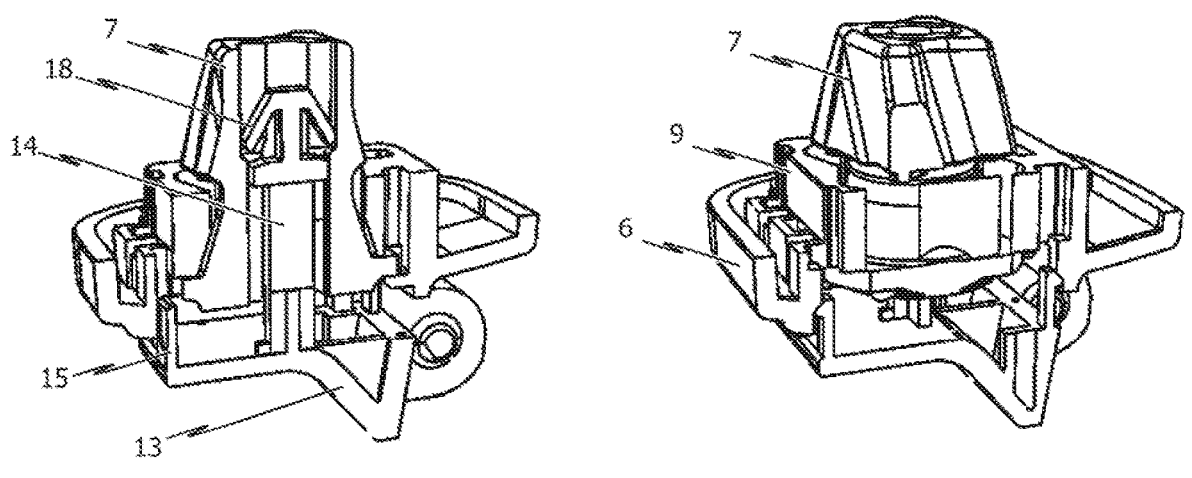
*FIG. 20*                                    *FIG. 21*

1

14

1

7     12

9

6

15

13

30    30

7

9

ASSEMBLY FOR PROVIDING A FASTENING POSSIBILITY FOR A VEHICLE COMPONENT

TECHNICAL FIELD

The present invention relates generally to a fastening possibility for fastening a vehicle component, in particular an interior component of a vehicle, to a body component. The vehicle component is in particular a vehicle grab handle.

More specifically, the present invention relates to an optimized fastening possibility, in particular for fastening a vehicle grab handle or an airbag to a body-side mounted portion, in particular in the automotive sector. The body-side mounted portion is also referred to here as a "vehicle body component."

BACKGROUND

Vehicle grab handles are provided in passenger cars, trucks, and sports cars for the purpose of providing support to occupants upon entering and exiting the vehicle. Vehicle grab handles can be static or dynamic. Dynamic grab handles can be moved between an extended position and a retracted position. Static grab handles, on the other hand, are fixedly attached, for example to the headliner of a vehicle.

Typically, vehicle grab handles are supplied parts, which are then mounted to a vehicle body in the simplest possible manner.

A wide variety of designs for vehicle grab handles are known. Currently available vehicle grab handles can be attached to the roof through the headliner or can be attached to one of the roof support pillars, which are known as the A, B, or C-pillar, either directly or via a trim part. The A-pillar is the roof support pillar located between the windshield and the window of the first row of seats. The B-pillar is the roof support pillar between the front and rear door or, in a coupe, the pillar which is located behind the doors of the vehicle. The C-pillar is the roof support pillar located between the rear door and the taillight of the vehicle.

The mounting/fastening of vehicle grab handles is usually carried out by means of a snap-in process. For this purpose, at least one fastening clip of the vehicle grab handle is commonly inserted into a provided fastening opening of a vehicle body component and fastened there. It is customary to cover the region of the fastening opening with cover caps or similar covers, so that it is no longer visible from the inside of the vehicle. The vehicle grab handles or the handle pieces belonging to the vehicle grab handles can be arranged in handle recesses provided for this purpose, so that a substantially flush surface is obtained and the handle piece of the vehicle grab handle can nevertheless be grabbed comfortably.

To fasten a vehicle grab handle to a vehicle body component, it is known, for example from publication EP 1 084 908 A2, to insert a screw through an opening of the grab handle, wherein a fastening clip having a passage opening is inserted through openings of the grab handle and the headliner. At the end of the passage opening, there is a short piece of internal threading, which accommodates the screw in the pre-assembly position. By means of the fastening clip, which is supported on the rear of the headliner, and the screw, the grab handle and the headliner are held together in the pre-assembly unit in the pre-assembly position. In order to accommodate the screw, a weld nut is provided on the vehicle frame or body-side mounted portion configured as the base part.

In this approach according to the prior art, however, the fact that, for the final assembly of the pre-assembly unit, an additional component is required as a third fastening element, which must be attached in a laborious separate work step, has proven to be disad-vantageous. Due to the positionally fixed attachment of the weld nut, a tolerance-based de-viation of the screw-on points on the pre-assembly unit on the body-side mounted portion cannot be compensated. Additional solutions for accommodating tolerances on the trim part must therefore be realized. The screw-on point on the vehicle frame must likewise be located in an accessible location, in which it is technically possible to attach the weld nut.

In principle, with the bolting of a vehicle grab handle to the vehicle body that is currently still customary, the mounting effort is relatively large.

SUMMARY

In light of the situation described above, the underlying problem of the present invention is to specify a fastening possibility for a vehicle component, in particular an interior component, to a body component, wherein the vehicle component, which is in particular a vehicle grab handle or an airbag, can be fastened to the body component in a particu-larly easy-to-implement manner, wherein at least a play-reduced and preferably play-free fastening of the inte-rior component to the body component can be effectively achieved, even in case of different sheet thicknesses of the body component and/or in case of tolerance-based devia-tions.

In particular, a lasting, high-quality connection between the vehicle component, for example the vehicle grab handle, and the vehicle body is to be achievable with as little mounting effort as possible.

This problem is solved in particular by the subject matter of independent claim 1.

Accordingly, an assembly for providing a fastening pos-sibility for a vehicle component, in particular an interior component, to a body component is proposed, wherein the assembly comprises a connecting element, preferably made of a plastic material, with which the vehicle component is connectable. This is, for example, a connecting element with a bearing block region, which serves to pivotally receive the handle part of the vehicle grab handle. Of course, other embodiments can also be considered here.

The assembly according to the invention further com-prises a retaining element, which is also preferably formed from a plastic material and which serves to retain the connecting element on the body component.

According to one aspect of the invention, the retaining element of the assembly comprises a base body with a retaining region at a first end region of the base body. The connecting element comprises a base body with a receptacle opening, through which the retaining element, and in par-ticular the retaining region of the retaining element, is at least regionally insertable or in which the retaining element is at least regionally receivable.

The assembly according to the invention is characterized in particular in that it is transferable from a pre-assembly or delivery state, in which the retaining region of the retaining element is not yet inserted through a fastening opening in the body component, i.e. a state in which the assembly is provided by the supplier, into a pre-fixation state, in which the retaining region of the retaining element is inserted through the fastening opening of the body component and an edge region of the body component surrounding the fastening opening is received at least regionally between the retaining region of the retaining element and the base body of the connecting element.

In order to transfer the assembly from its pre-assembly or delivery state into its pre-fixation state, a torque is exerted on at least the retaining region of the retaining element in such a way that, starting from a base state, at least the retaining region of the retaining element is twisted relative to the connecting element and relative to the fastening opening of the body component in order to allow a passage of the retaining region through the fastening opening of the body component.

After the passage of the retaining element through the fastening opening of the body component, the torque previously exerted on the retaining region is at least partially lifted and the retaining region is again in its base state.

The assembly according to the invention is thus characterized in that, for the mounting of the assembly on the body component, it has only to be inserted into the fastening opening of the body component. The assembly is transferred from its pre-assembly or delivery state "automatically" into its pre-fixation state. The assembly can thus be mounted to the body component with simple movements by hand. In particular, no tools are required for this purpose.

Moreover, because the assembly is provided in its pre-assembly or delivery state by the supplier, it is not necessary to properly put together the individual components of the assembly during final mounting.

Overall, a simplified mounting of the assembly, which is embodied in particular as a torsion clip, is thus possible.

According to realizations of the present invention, it is provided that the retaining element is twistable relative to the connecting element about an axis of rotation extending in the insertion direction of the retaining element, namely:

from a first rotational position of the retaining element, in which the retaining element is connectable to the connecting element for putting together the assembly, into a second rotational position of the retaining element, in which the retaining element is connected to the connecting element and the assembly is in its pre-assembly or delivery state or in its pre-fixation state; and from the second rotational position of the retaining element into a third rotational position of the retaining element, in which the retaining element is located when the retaining region passes through the fastening opening of the body component.

According to the first aspect of the invention, the assembly according to the invention is further transferable from its pre-fixation state into a fixed state, in which the retaining region of the retaining element inserted through the fastening opening of the body component exerts a force, which acts on the edge region of the body component surrounding the fastening opening at least regionally counter to the insertion direction, in order to thus fix the connecting element to the body component.

In order to transfer the assembly from its pre-fixation state into its fixed state, according to embodiments of the invention, the retaining element is further twisted relative to the connecting element from its rotational position into a fourth rotational position.

In order to ensure that, even in the case of different sheet thicknesses of the body component and/or tolerance-based deviations, the assembly or connecting element of the assembly is fastened on the body component in as play-reduced and preferably play-free manner as possible, it is provided according to embodiments of the invention that the retaining element, and in particular the retaining region of the retaining element, is associated with at least one in particular wedge-shaped or ramp-shaped clamping region, which, when the assembly is transferred into its fixed state, and in particular when the retaining element is twisted from its second rotational position into its fourth rotational position, is rotated into an in particular gap-shaped region between the retaining element, in particular the retaining region of the retaining element, and the edge region of the body component surrounding the fastening opening of the body component, in particular by the exertion of a leverage effect.

Here, it is preferably provided that the base body of the connecting element preferably comprises a housing region, which is adapted preferably at least regionally to the size and/or geometry of the fastening opening of the body component, and which is accommodated at least regionally in the fastening opening of the body component in the pre-fixation state and in the fixed state of the assembly.

In this context, it is provided in particular that the housing region is preferably designed to be elastically deformable at least regionally in the insertion direction or comprises corresponding regions that are elastically deformable at least regionally in the insertion direction. This is meant to ensure that the housing region or the elastically deformable region of the housing region is elastically deformed or deformable at least regionally or partially when the in particular wedge-shaped or ramp-shaped clamping region is twisted in due to the leverage effect exerted thereby. This provides an easy-to-implement, but none-theless simple possibility for realizing a play-free fastening of the connecting element to the body component in case of different sheet thicknesses and/or tolerance-based deviations.

According to implementations of the assembly according to the invention, it is preferably provided that the connecting element comprises alignment means for aligning the connecting element and the retaining element inserted into the opening of the base body of the connecting element relative to the fastening opening of the body component. The alignment means are in particular designed in order to realize an alignment of the connecting element relative to the fastening opening of the body component according to the poka-yoke principle.

In this context, it is conceivable, for example, that the retaining region of the retaining element has a geometry, in particular cross-sectional geometry, and/or size, that is adjusted with respect to the fastening opening of the body component such that, in the state of being aligned with respect to the fastening opening of the body component, the retaining region of the retaining element is only insertable in its state of being twisted out of the base state through the fastening opening of the body component.

In this context, it is conceivable that the retaining region of the retaining element preferably comprises at least one in particular outer-peripheral guiding surface, which is configured in order to generate a torque for twisting the retaining region out of its base state when transferring the assembly from its pre-assembly or delivery state into its pre-fixation state and when the retaining region is inserted into the fastening opening of the body component in the insertion direction relative to the body component.

Preferably, the assembly further comprises a locking and/or blocking element, preferably made of a plastic material, for establishing a position of the retaining element relative to the connecting element.

According to implementations of the locking and/or blocking element, it is provided that it comprises a torsion element, in particular in the form of a torsion spring element, which interacts with the retaining region of the retaining element at least in the pre-assembly or delivery state of the assembly such that, when the assembly is transferred from its pre-assembly or delivery state into its pre-fixation state, said torsion element is elastically twisted about its longitudinal axis due to the twisting of the retaining region relative to the fastening opening of the body component.

Alternatively or additionally, the locking and/or blocking element is to comprise preferably at least one latching means for preferably releasably latching the locking and/or blocking element at least in its second state.

According to embodiments of the assembly according to the invention, the base body of the retaining element comprises a passage extending in the longitudinal direction of the base body or a recess extending in the longitudinal direction of the base body, in which the torsion element of the locking and/or blocking element is received or receivable at least regionally. On an inner peripheral surface of the passage extending in the longitudinal direction of the base body or recess extending in the longitudinal direction of the base body, at least one helical groove is preferably formed, with which, at least in the pre-assembly or delivery state of the assembly, at least one region of the torsion element, in particular a sliding block region of the torsion element, engages.

As already stated, the assembly according to the invention is preferably transferable from its pre-fixation state into a fixed state, in which the retaining region of the retaining element inserted through the fastening opening of the body component exerts a force, which acts on the edge region of the body component surrounding the fastening opening at least regionally counter to the insertion direction, in order to fix the connecting element to the body component.

In this context, it is preferably provided that, when transferring the assembly from its pre-fixation state into its fixed state, as well as in the fixed state of the assembly, the engagement of the torsion element with the at least one in particular helical groove of the base body of the retaining element is suspended.

The locking and/or blocking element is transferable from a first state, in which the assembly is in its pre-assembly or delivery state, into a second state, in which the assembly is in its fixed state. In the first state of the locking and/or blocking element, it preferably blocks a transfer of the retaining element from the second rotational position into the first rotational position. On the other hand, upon transfer of the locking and/or blocking element into its second state, the engagement of the torsion element with the in particular helical groove of the retaining element is preferably released, and the retaining element is twisted from its second rotational position into its fourth rotational position, preferably "automatically".

For this purpose, the assembly preferably comprises at least one element configured in order to, when the locking and/or blocking element is transferred from its first state into its second state, translate an in particular linear movement of the locking and/or blocking element relative to the connecting element into a rotational movement of the retaining element relative to the connecting element in order to transfer the retaining element into its fourth rotational position, preferably "automatically".

The base body of the retaining element is preferably arranged at least regionally in a rotationally symmetrical manner, wherein a crown region, designed in particular to be at least regionally annular, is formed preferably at a second end region of the base body lying opposite the first end region, and wherein a fitted region is formed between the crown region and the retaining region of the retaining element.

Preferably, the base body of the connecting element preferably comprises a support surface adapted at least regionally to the geometry and/or size of the crown region in such a way that, at least in the pre-assembly or delivery state of the assembly and preferably further in the pre-fixation state of the assembly, the crown region of the retaining element rests at least regionally on the support surface of the connecting element.

In this context, it is conceivable that at least one recess is formed in the crown region of the retaining element, and wherein the connecting element comprises a region designed to be at least regionally complementary to the at least one recess of the crown region and protruding in the direction of the receptacle opening of the connecting element, which region is configured such that, in the first rotational position of the retaining element and preferably only in the first rotational position of the retaining element, the retaining element is connectable to the connecting element in such a way that the crown region of the retaining element at least regionally rests on the support surface of the connecting element.

In this context, it is preferably provided that the at least one region protruding in the direction of the receptacle opening of the connecting element is arranged offset from the plane in which the crown region of the retaining element lies, in particular in such a way that the at least one region protruding in the direction of the receptacle opening of the connecting element blocks a release of the connection between the retaining element and the connecting element in the second rotational position of the retaining element.

Accordingly, a concept based on the poka-yoke principle is also employed here in order to pre-assemble the assembly, i.e. to transfer the assembly into its pre-assembly or delivery state.

According to a further aspect of the present invention, this assembly for providing a fastening possibility for a vehicle component, in particular an interior component such as a vehicle grab handle, is related to a body component, wherein the assembly preferably comprises a connecting element made of a plastic material, to which the vehicle component is connectable. The assembly further comprises a retaining element, preferably made of a plastic material, for retaining the connecting element to the body component.

The assembly according to the second aspect of the invention is characterized in particular in that the retaining element comprises a base body with a retaining region at a first end region of the base body, wherein the connecting element comprises a base body with a receptacle opening, through which the retaining element and in particular the retaining region of the retaining element are insertable at least regionally.

The assembly according to the second aspect of the present invention is transferable from a pre-assembly state, in which the retaining region of the retaining element is insertable or inserted through a fastening opening in the body component, into a fixed state, in which the retaining region of the retaining element inserted through the fastening opening of the body component exerts a force, which acts on the edge region of the body component surrounding the fastening opening at least regionally counter to the insertion direction in order to fix the connecting element to the body component.

Preferably, the assembly further comprises a locking and/or blocking element, preferably made of a plastic material, for establishing a position of the retaining element relative to the connecting element.

The locking and/or blocking element is transferable from a first state, in which the assembly is in its pre-assembly state, into a second state, in which the assembly is in its fixed state.

The assembly comprises at least one element configured in order to, when the locking and/or blocking element is transferred from its first state into its second state, translate an in particular linear movement of the locking and/or blocking element relative to the connecting element into a rotational movement of the retaining element relative to the connecting element in order to transfer the assembly into its fixed state.

The assembly according to the first and second aspects of the present invention is preferably formed entirely from a plastic material.

It is characterized by its constructively simple manufacture and can be achieved, for example, by a common injection-molding process for the retaining element and/or the connecting element.

BRIEF DESCRIPTION OF THE DRAWINGS

Exemplary embodiments of the solution according to the invention are described in further detail below, with reference to the accompanying drawings.

The following are shown:

FIG. 4 schematically and in an isometric exploded view, an exemplary embodiment of the assembly according to the invention;

FIG. 5 schematically and in a second isometric exploded view, the exemplary embodiment of the assembly according to the invention according to FIG. 4;

FIG. 8 schematically and in a first isometric view, an exemplary embodiment of a connecting element of the assembly according to the invention;

FIG. 9 schematically and in a second isometric view, the exemplary embodiment of the connecting element according to FIG. 8;

FIG. 12 schematically and in a first isometric view, an embodiment of a locking and/or blocking element of the assembly of the present invention;

FIG. 13 schematically and in a second isometric view, the embodiment of the locking and/or blocking element according to FIG. 12;

FIG. 19 schematically and in an isometric view, an exemplary embodiment of the assembly according to the invention in its pre-assembly or delivery state;

FIG. 20 schematically, a first sectional view of the assembly according to FIG. 19;

FIG. 21 schematically, a second sectional view of the assembly according to FIG. 19;

DETAILED DESCRIPTION

Figure 1:
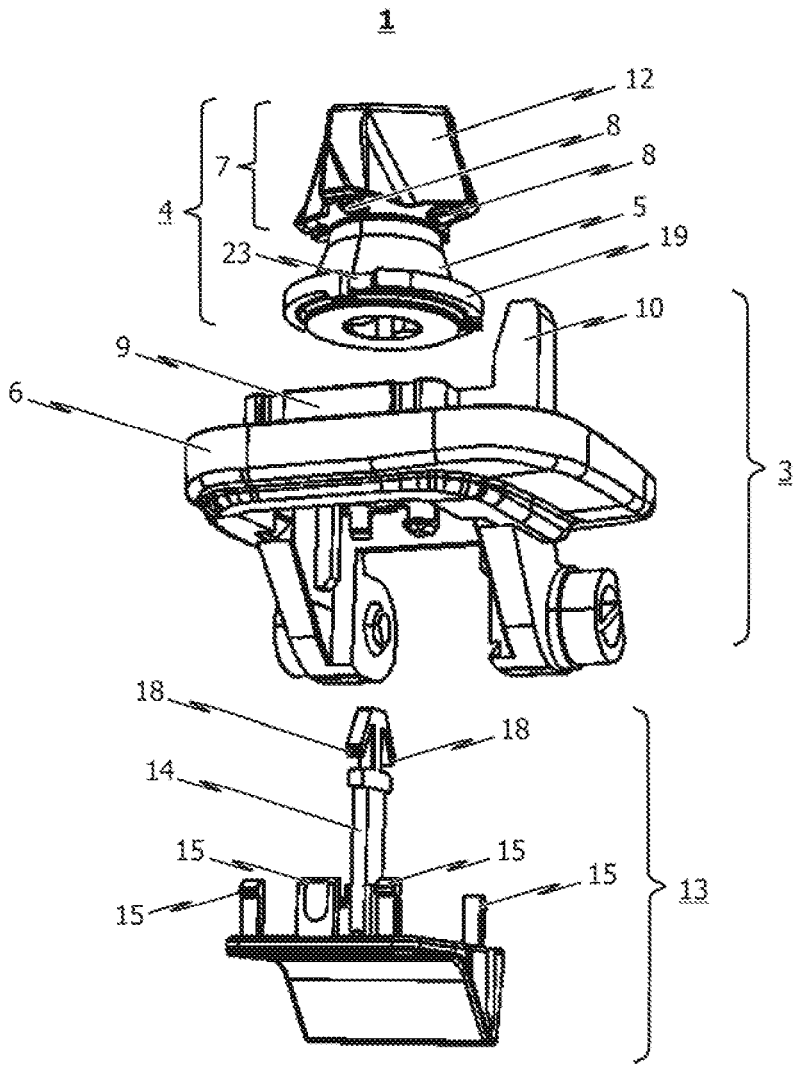
FIG. 1 schematically and in a first isometric exploded view, an exemplary embodiment of the assembly according to the invention.
Figure 2:
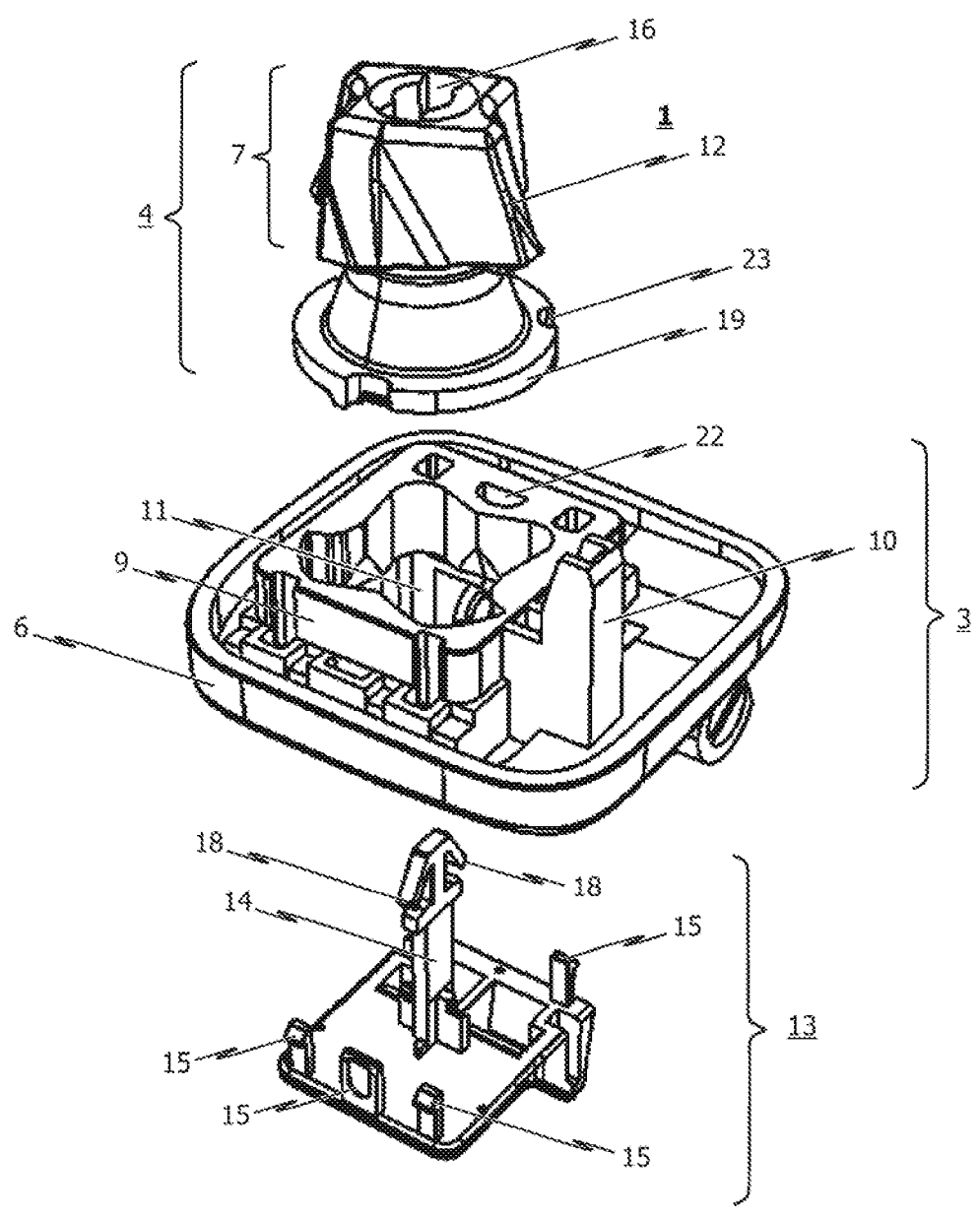
FIG. 2 schematically and in a second isometric exploded view, the exemplary embodiment of the assembly according to the invention according to FIG. 1.
Figure 3:
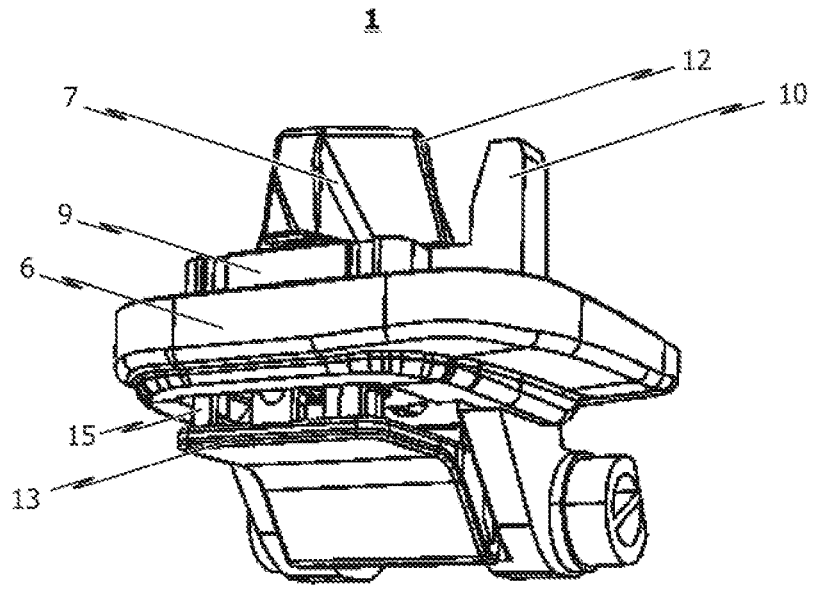
FIG. 3 schematically and in an isometric view, the exemplary embodiment of the assembly according to the invention according to FIG. 1 in a pre-assembly or delivered state.
Figure 6:
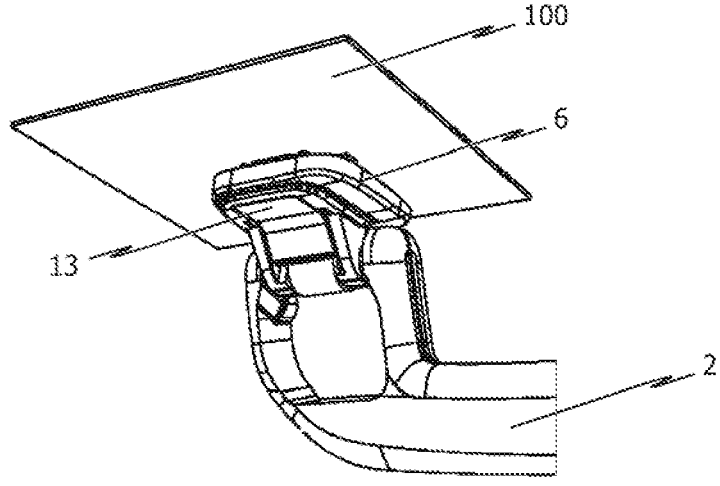
FIG. 6 schematically and in an isometric view, a further exemplary embodiment of the assembly according to the invention in its state of being fastened to the vehicle body component.

Referring now to the drawings, various embodiments of the fastening assembly 1 according to the invention will be described. It should be noted here that the individual features of the exemplary embodiments of the fastening assemblies 1 shown in the drawings can be combined together as desired.

While the exemplary embodiments of the fastening assemblies 1 shown in the drawings are described in connection with a grab handle 2, the use of the fastening assembly 1 is not limited to this application. Rather, the fastening assembly 1 according to the invention is suitable for providing a fastening possibility for any vehicle component 2, in particular an interior component, to a body component 100. An example in this regard is fastening, for example, of airbags or other interior components, in particular.

The body component 100 is preferably a sheet metal part. Again, this is not to be construed as limiting. Other body components, in particular interior skin components of the vehicle, can be considered.

The fastening assembly 1 according to the invention is characterized in particular in that all components of the assembly 1 are formed from a plastic material. The individual components of the fastening assembly 1 are in particular designed as plastic injection-molding parts.

The fastening assembly 1 can in particular be mounted without tools, wherein the fastening assembly 1 is delivered in a pre-assembly or delivery state into the vehicle manufacturer.

In order to mount the fastening assembly 1, it is insertable into a fastening opening 101 of the body component 100, wherein, during the insertion operation, the fastening assembly 1 first self-transfers from its pre-assembly or delivery state into a pre-fixation state, and is then transferable into a fixed state. In doing so, the fastening assembly 1 is sequentially transferred in one movement by hand upon mounting in or on the body component 100 from the pre-assembly or delivery state into the pre-fixation state and then into the final fixed state.

In the process, the assembly 1 automatically/independently performs a tolerance compensation. This allows the fastening assembly 1 to also be usable for different sheet thicknesses of the body component 100, for example. Also, the fastening assembly 1 automatically balances tolerance deviations in the size and/or shape of the fastening opening 101 formed in the body component 100.

After mounting of the fastening assembly 1, it can be released from the fixed state by manipulation with a tool, in particular with a screwdriver.

The fastening assembly 1 substantially comprises a connecting element 3, which—as already stated—is preferably embodied as a plastic part, in particular an injection molded part. The connecting element 3 serves to provide a connection to the vehicle component 2 to be fastened, for example an interior grab handle.

In addition to the connecting element 3, the fastening assembly 1 comprises a retaining element 4, which is also preferably made of a plastic material, and in particular a plastic injection molded part. The retaining element 4 serves to hold the connecting element 3, to which the vehicle component 2 is connectable, to the body component 100.

The retaining element 4 substantially comprises a base body 5, which in turn comprises a retaining region 7 at a first end region of the base body 5.

The connecting element 3 likewise comprises a base body 6 with a receptacle opening 11, in which or through which the retaining element 4, and in particular the retaining region 7 of the retaining element 4, is at least regionally receivable/insertable.

As already stated, the assembly 1 is transferable from a pre-assembly or delivery state into a pre-fixation state. In the pre-assembly or delivery state of the assembly 1, the retaining region 7 of the retaining element 4 is not yet inserted through the fastening opening 101 in the body component 100.

In the pre-fixation state of the assembly 1, on the other hand, the retaining region 7 of the retaining element 4 is already inserted through the fastening opening 101 of the body component 100, and an edge region surrounding the fastening opening 101 of the body component 100 is at least regionally accommodated between the retaining region 7 of the retaining element 4 and the base body 6 of the connecting element 3.

Here, it is expedient for a fitted region to be formed between the first end region of the base body 5, at which the retaining region 7 of the retaining element 4 is formed, and the opposite second end region of the base body 5, which fitted region is arranged in the pre-fixation state of the assembly 1 radially adjacent to the edge region surrounding the fastening opening 101 of the body component 100.

According to embodiments of the fastening assembly 1 according to the invention, the base body 5 of the retaining element 4 is preferably designed in order to be rotationally symmetrical at least regionally.

It can further be seen in the exemplary embodiments of the assembly 1 according to the invention, shown schematically in the drawings, that a crown region 19, designed in particular to be at least regionally annular, is formed at a second end region of the base body 5 lying opposite the first end region of the base body 5 of the retaining element 4, wherein the aforementioned fitted region is formed between the crown region 19 and the retaining region 7.

When transferring the assembly 1 from its pre-assembly or delivery state into its pre-fixation state, a torque is exerted on at least the retaining region 7 of the retaining element 4 in such a way that, starting from a base state of the retaining region 7, at least the retaining region 7 of the retaining element 4 is twisted relative to the connecting element 3 and relative to the fastening opening 101 of the body component 100 in order to allow a passage of the retaining region 7 through the fastening opening 101 of the body component 100.

After the passage of the retaining element 4 or retaining region 7 of the retaining element 4 through the fastening opening 101 of the body component 100, the torque previously exerted on the retaining region 7 is at least partially lifted, and the retaining region 7 is again in its base state, i.e. in the rotational position relative to the connecting element 3 and relative to the fastening opening 101 of the body component 100, in which the retaining region 7 is in the pre-assembly or delivery state of the assembly 1, that is to say before the retaining region 7 of the retaining element 4 has been inserted through the fastening opening 101 of the body component 100.

In other words, the fastening assembly 1 is designed such that the retaining element 4, in particular the retaining region 7 of the retaining element 4, is twistable relative to the connecting element 3 of the assembly 1 about an axis of rotation extending in the insertion direction of the retaining element 4.

In particular, the retaining element 4, in particular the retaining region 7 of the retaining element 4, is twistable relative to the connecting element 3 of the assembly 1 about an axis of rotation extending in the insertion direction of the retaining element 4 from a first rotational position of the retaining element 4 or retaining region 7 of the retaining element 4, in which position the retaining element 4 is connectable to the connecting element 3 for putting together the assembly 1 (put-together state), into a second rotational position of the retaining element 4 or retaining region 7 of the retaining element 4, in which position the retaining element 4 is connected to the connecting element 3 and in which position the assembly 1 is in its pre-assembly or delivery state.

The second rotational position of the retaining region 7 of the retaining element 4 preferably corresponds to the aforementioned basic state of the retaining region 7, i.e. the rotational position of the retaining region 7 relative to the connecting element 3 and relative to the fastening opening 101 of the body component 100 in the pre-assembly or delivery state of the assembly 1.

The second rotational position of the retaining region 7 of the retaining element 4 is preferably also present when the assembly 1 is in its pre-fixation state.

In other words, in order to put together the assembly 1 and transfer the assembly 1 into its pre-assembly or delivery state, the retaining element 4 is mounted to the connecting element 3 with the retaining region 7, namely by inserting the retaining element 4 onto the connecting element 3 and transferring it from the first rotational position into the second rotational position relative to the connecting element 3 in order to secure the retaining element 4 on the connecting element 3 (=put-together state).

After the assembly of the retaining element 4 on the connecting element 3, as a result of which the retaining element 4 is transferred from the first rotational position into the second rotational position relative to the connecting element 3, the assembly 1 is in the aforementioned pre-assembly or delivery state, in which the retaining element 4 is temporarily fastened to the connecting element 3.

In the pre-assembly or delivery state, the assembly 1 is thus present as a (single) component consisting of the connecting element 3 and the retaining element 4 fastened thereto.

According to embodiments of the assembly 1 according to the invention, it is further provided that the retaining element 4 or retaining region 7 of the retaining element 4 can be further transferred from the second rotational position into a third rotational position about the rotational axis extending in the insertion direction of the retaining element.

The retaining element 4 or retaining region 7 of the retaining element 4 is in the third rotational position when the retaining region 7 is inserted through the fastening opening 101 of the body component 100 upon transfer of the assembly from its pre-assembly or delivery state into its pre-fixation state.

According to design variants of the assembly 1 according to the invention, the assembly is further transferable from its pre-fixation state into a fixed state, in which the retaining region 7 of the retaining element 4 inserted through the fastening opening 101 of the body component 100 exerts a force, which acts on the edge region of the body component 100 surrounding the fastening opening 101 at least regionally counter to the insertion direction, in order to fix the connecting element 3 to the body component 100.

In particular, it is provided here that, when the assembly 1 is in its pre-fixation state, i.e. when the retaining region 7 of the retaining element 4 is already inserted through the fastening opening 101 of the body component 100 and an edge region of the body component 100 surrounding the fastening opening 101 is received at least regionally between the retaining region 7 of the retaining element 4 and the base body 6 of the connecting element 3, the assembly 1 is still movable relative to the body component 100. For play-free fixation of the assembly 1, it is provided that the assembly 1 is transferable from its pre-fixation state into the fixed state.

In this context, it is conceivable that the retaining element 4 or retaining region 7 of the retaining element 4 can further be twisted relative to the connecting element 3 about the rotational axis extending in the insertion direction of the retaining element 4, namely from the second rotational position, in which the retaining element 4 or retaining region 7 of the retaining element 4 is in the pre-fixation state, into a fourth rotational position.

The different rotational positions of the retaining element 4 or retaining region 7 of the retaining element 4 are to be described in greater detail by way of example, with reference to the illustrations in FIG. 14 to FIG. 18.

Figure 14A:
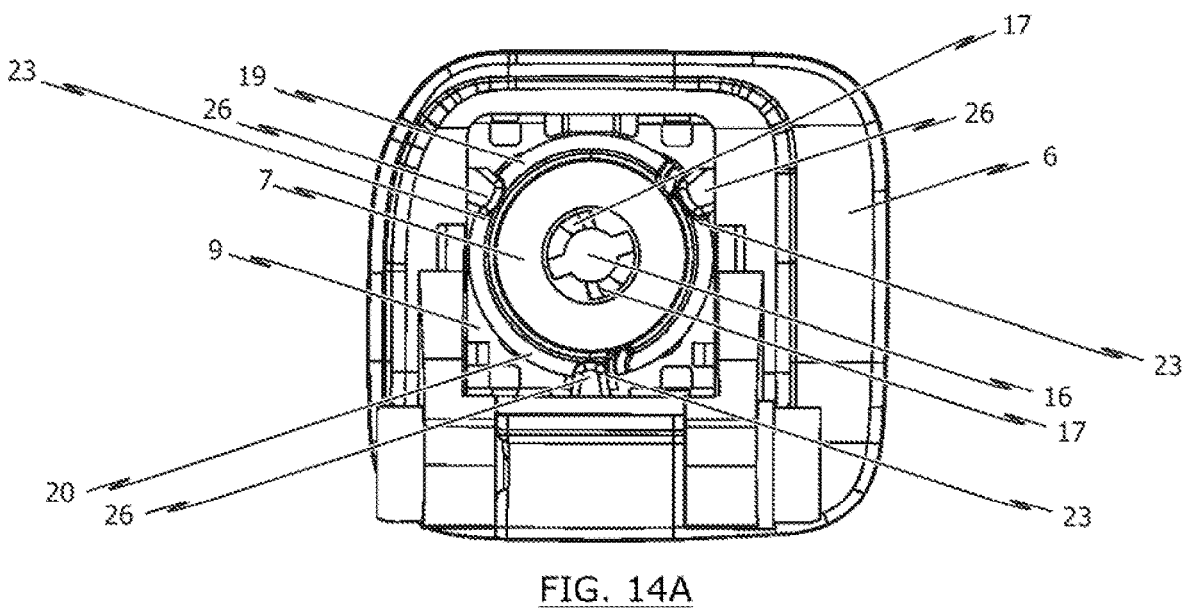
FIG. 14A schematically and in a top plan view, an exemplary embodiment of the assembly according to the invention in a put-together state of the assembly.
Figure 14B:
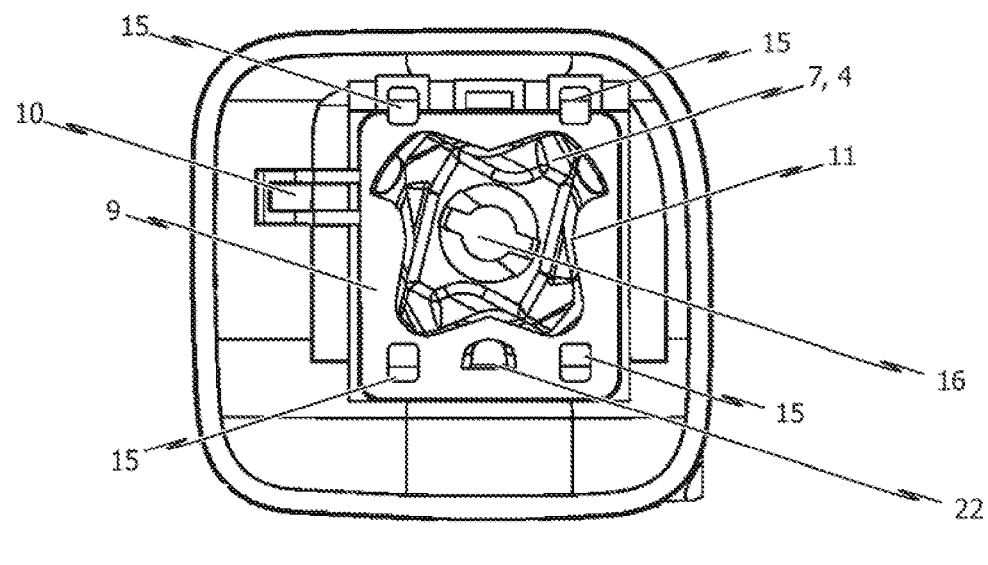
FIG. 14B schematically and rotated about 180°, the assembly according to FIG. 14A.

Specifically, FIG. 14A and in FIG. 14B show an exemplary embodiment of the assembly according to the invention in a state in which the assembly is not (yet) in its preassembly or delivery state, but rather in its assembly state. Thus, in particular, FIG. 14A and in FIG. 14B show a state in which the connecting element 3 and the retaining element 4 are connectable to one another.

The illustration in FIG. 14A shows in this context that, in the put-together state of the assembly 1, the base body 5 of the retaining element 4 is connectable to the base body 6 of the connecting element 3. For this purpose, a connection is formed between the second end region of the base body 5 of the retaining element 4 and a support surface 20 of the base body 6 of the connecting element 3.

Specifically, the base body 6 of the connecting element 3 has a support surface 20 adapted at least regionally to the geometry and/or size of the crown region 19 formed at the second end region of the base body 5 of the retaining element 4, said support surface being adapted such that the recesses 23 formed in the crown region 19 are aligned with regions 26 correspondingly arranged to be complementary in this regard and which protrude in the direction of a receptacle opening 11 of the connecting element 3.

Figure 15A:
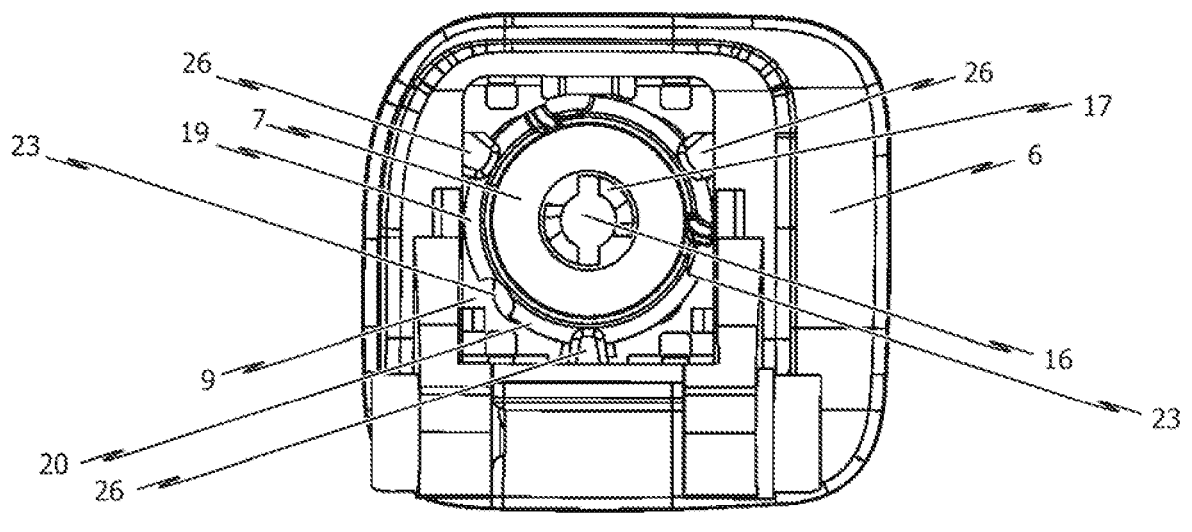
FIG. 15A schematically and in a top view, the exemplary embodiment of the assembly according to FIG. 14A in the pre-assembly or delivery state of the assembly.
Figure 15B:
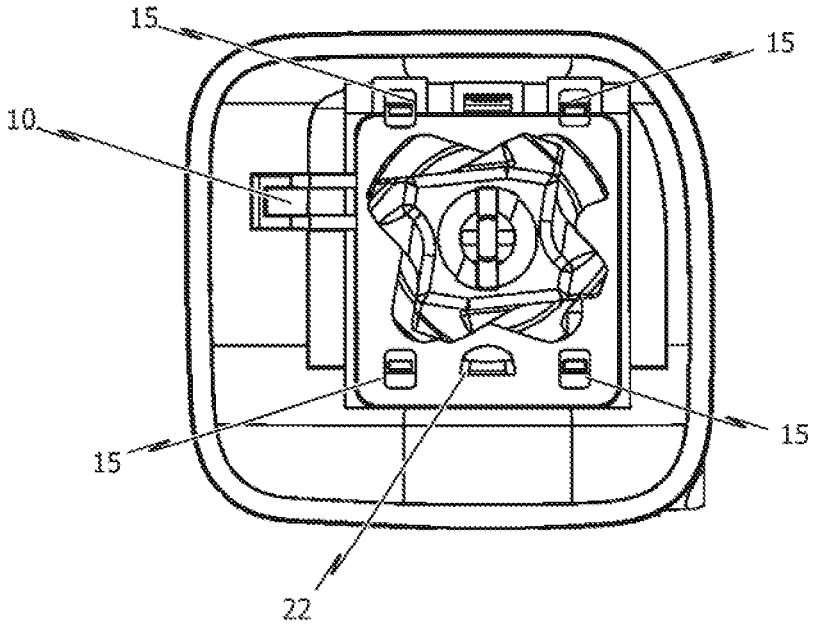
FIG. 15B schematically and rotated about 180°, the assembly according to FIG. 15A.

After the crown region 19 rests on the support surface 20 of the connecting element 3, the retaining element 4 is transferred relative to the connecting element 3 from the first rotational position illustrated in FIG. 14A and FIG. 14B into the second rotational position illustrated in FIG. 15A and FIG. 15B, in which the protruding regions 26 of the connecting element 3 are no longer aligned with the recesses 23 of the crown region 19 of the retaining element 4, and thus the retaining element 4 is retained on the connecting element 3.

Here, the regions 26 protruding in the direction of the receptacle opening 11 of the connecting element 3 are arranged offset from the plane in which the crown region 19 of the retaining element 4 lies, in particular in such a way that the regions 26 protruding in the direction of the receptacle opening 11 of the connecting element 23 block a release of the connection between the retaining element 4 and the connecting element 3 in the second rotational position of the retaining element 4 (cf. FIG. 15A and FIG. 15B).

The second rotational position of the retaining element 4, or retaining region 7 of the retaining element 4, relative to the connecting element 3 is illustrated in FIG. 15A and FIG. 15B. In this state, the assembly 1 is in the pre-assembly or delivery state.

In particular, the illustration in FIG. 15A shows how the crown region 19 is fastened, with the aid of the regions 26, to the base body 5 of the retaining element 4 on the support surface 20 on the base body 6 of the connecting element 3. The fastening is selected such that the retaining element 4 can now only be rotated relative to the connecting element 3.

Figure 16A:
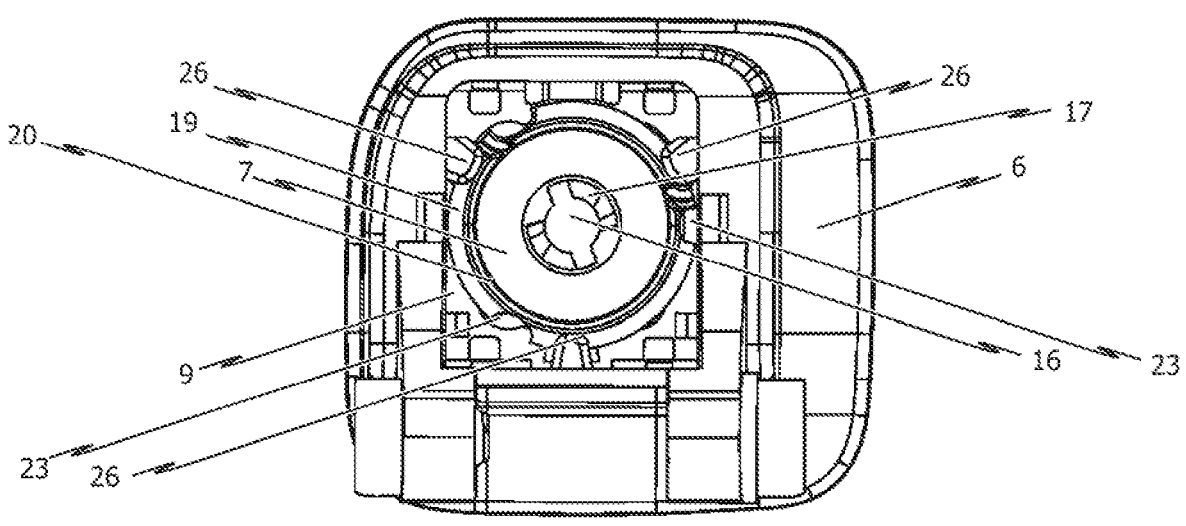
FIG. 16A schematically and in a top plan view, the assembly according to FIG. 15A upon transfer from its pre-assembly or delivery state into a pre-fixation state of the assembly.
Figure 16B:
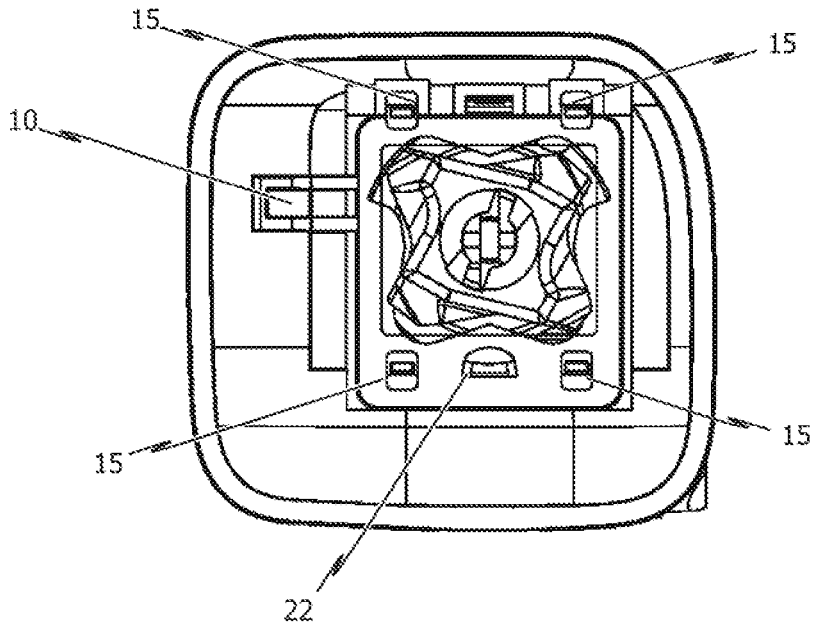
FIG. 16B schematically and rotated about 180°, the assembly according to FIG. 16A.

FIG. 16A and FIG. 16B each show a situation in which the assembly 1 is transferred from the pre-assembly or delivery state shown in FIG. 15A and FIG. 15B into the pre-fixation state.

Specifically, FIG. 16A and FIG. 16B show that, when the retaining region 7 of the retaining element 4 is passed through the fastening opening of the body component, said retaining region is transferred from the second rotational position shown in FIG. 15A and FIG. 15B (temporarily) into the third rotational position.

Figure 17A:
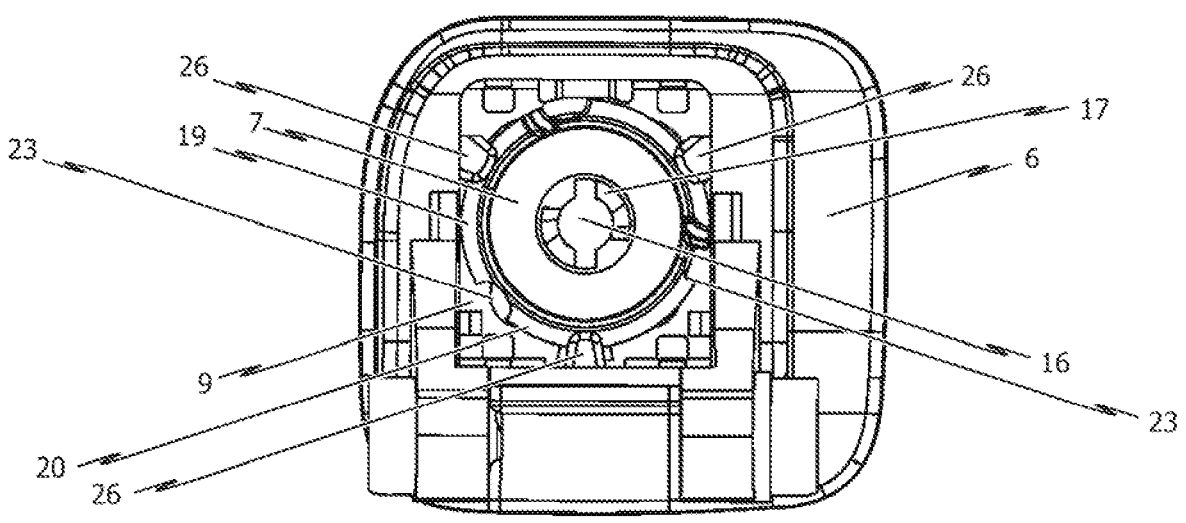
FIG. 17A schematically and in a top plan view, the assembly according to FIG. 16A in a pre-fixation state of the assembly.
Figure 17B:
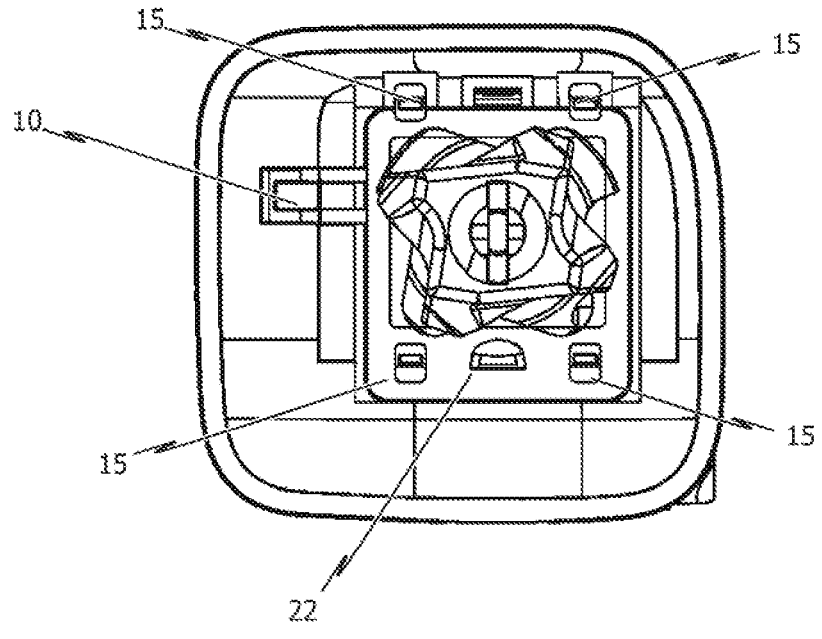
FIG. 17B schematically and rotated about 180°, the assembly according to FIG. 17A.

As shown in the illustrations in FIG. 17A and FIG. 17B, after the retaining region 7 of the retaining element 4 has passed through the fastening opening of the body component, i.e. after the retaining region 7 of the retaining element 4 has been inserted through the fastening opening of the body component, the retaining region 7 of the retaining element 4 jumps again from the third rotational position shown in FIG. 16A and FIG. 16B back into its second rotational position.

A comparison of the rotational position of the retaining region 7 of the retaining element 4 in FIG. 17A with the rotational position of the retaining region 7 of the retaining element 4 in FIG. 15A shows that the rotational position of the retaining region 7 of the retaining element 4 in the pre-fixation state according to FIG. 17A and FIG. 17B matches the rotational position of the retaining region 7 of the retaining element 4 in the pre-assembly or delivery state according to FIG. 15A and FIG. 15B.

However, in the pre-fixation state according to FIG. 17A and FIG. 17B, the edge region of the body component surrounding the fastening opening is received at least regionally between the retaining region 7 of the retaining element 4 and the base body 6 of the connecting element 3 (the body component is not shown in FIG. 17A and FIG. 17B).

Figure 18A:
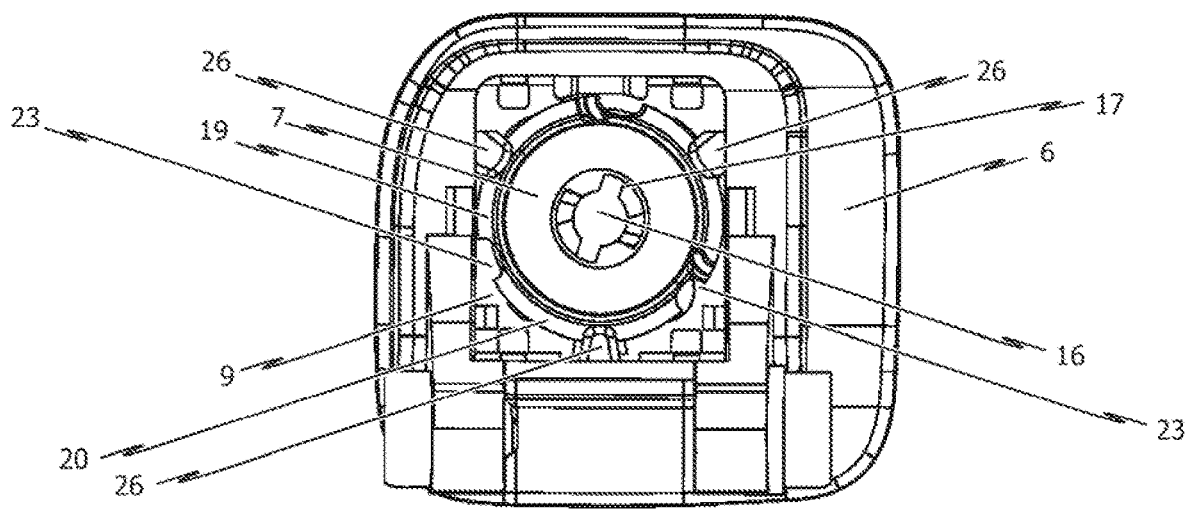
FIG. 18A schematically and in a top plan view, the assembly according to FIG. 17A in a fixed state of the assembly.
Figure 18B:
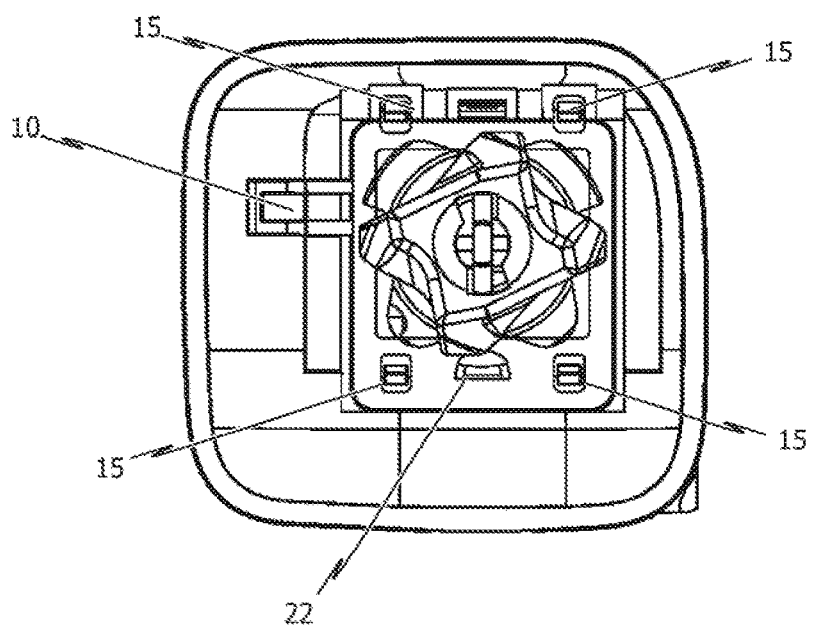
FIG. 18B schematically and rotated about 180°, the assembly according to FIG. 18A.
Figure 22:
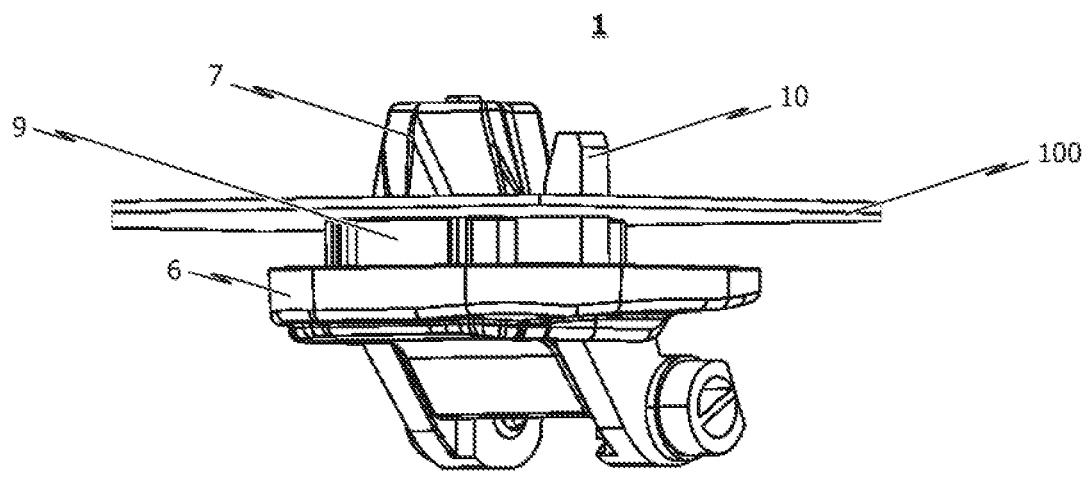
FIG. 22 schematically and in an isometric view, an exemplary embodiment of the assembly according to the invention in its fixed state.

FIG. 18A and FIG. 18B show the fixed state of the assembly 1.

It can be seen that, in the fixed state of the assembly 1, the retaining region 7 of the retaining element 4 is further twisted relative to the connecting element 3, namely in comparison to the pre-fixation state according to FIG. 17A and FIG. 17B.

In other words, in the fixed state according to FIG. 18A and FIG. 18B of the assembly 1, the retaining element 4 or retaining region 7 of the retaining element 4 is in its fourth rotational position.

By further twisting the retaining region 7 of the retaining element 4 relative to the connecting element 3, a force acting in the insertion direction is generated according to the leverage principle, which results in the retaining element 4 being tensed against the connecting element 3, causing a Z-axis compensation. Here, the Z-axis refers to the insertion direction of the assembly 1.

Figure 26:
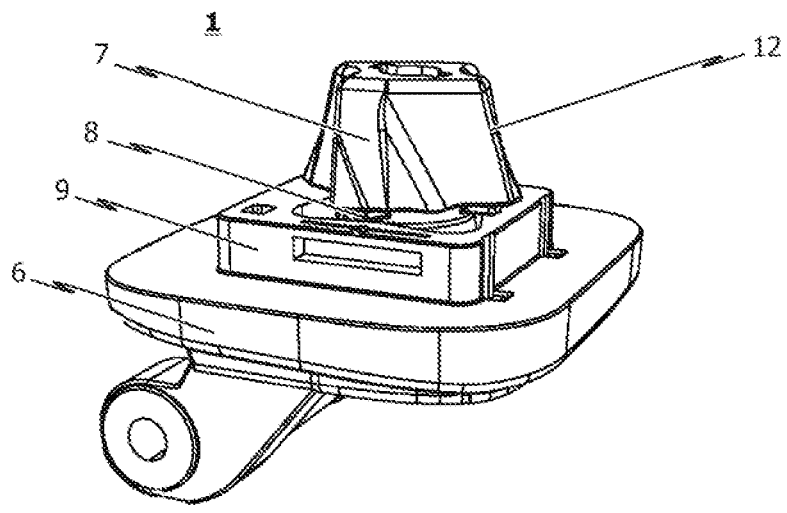
FIG. 26 schematically and in an isometric view, an embodiment of the assembly according to the invention in its fixed state.
Figure 27:
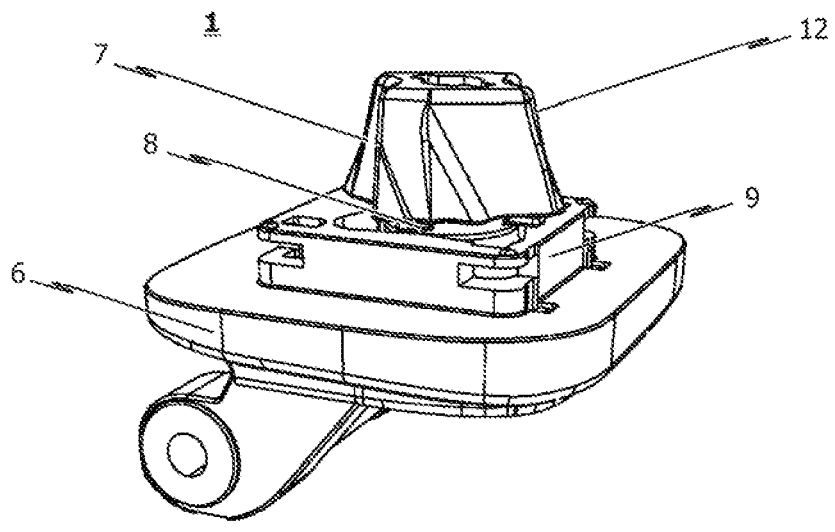
FIG. 27 schematically and in an isometric view, an embodiment of the assembly according to the invention in its fixed state.
Figure 28:
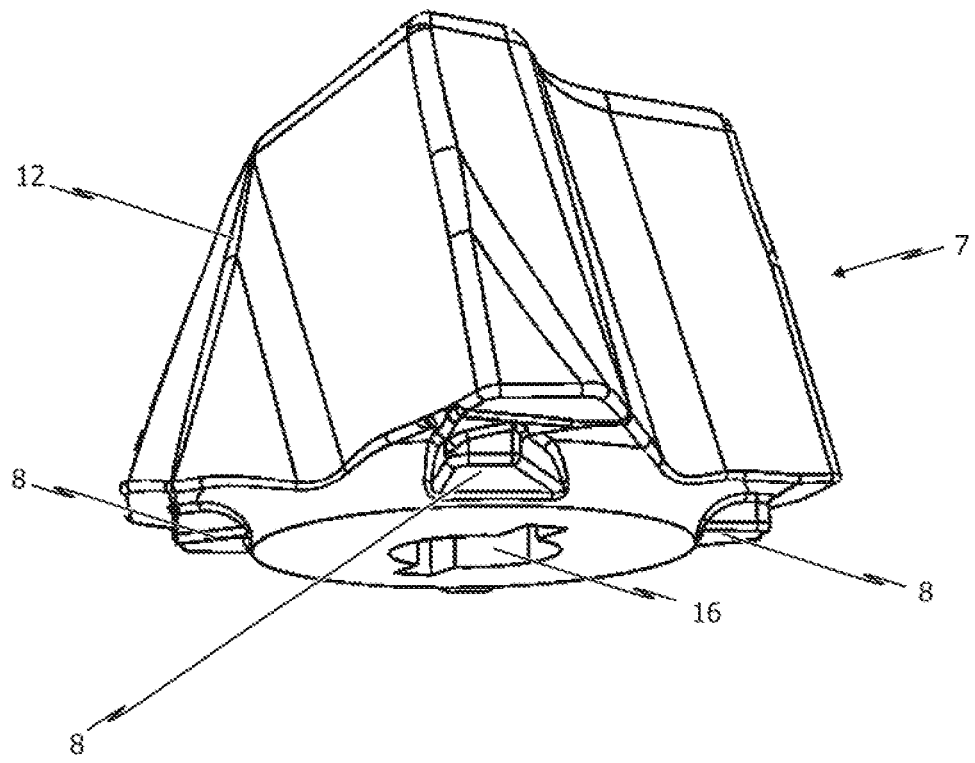
FIG. 28 schematically and in an isometric view, an exemplary embodiment of a retaining region of a retaining element of the assembly according to the invention.

FIG. 26 to FIG. 28 show how such a leverage effect can be caused when transferring the assembly 1 from its pre-fixation state into the fixed state.

For example, it is conceivable that the retaining element 4, in particular the retaining region 7 of the retaining element 4, is associated with at least one in particular wedge-shaped or ramp-shaped clamping region 8, which, when the assembly 1 is transferred into its fixed state, and in particular when the retaining element 4 is twisted from its second rotational position into its fourth rotational position, is rotated into an in particular gap-shaped region between the retaining element 4, and in particular the retaining region 7 of the retaining element 4, and the edge region of the body component surrounding the fastening opening 101 of the body component 100, namely by the exertion of a leverage effect.

The wedge-shaped or ramp-shaped clamping regions 8 of the retaining region 7 of the retaining element 4 are shown in detail in FIG. 28.

On the other hand, it is preferred that the base body 6 of the connecting element 3 preferably comprises a housing region 9, which is adapted preferably at least regionally to the size and/or geometry of the fastening opening 101 of the body component 100, and which is accommodated at least regionally in the fastening opening 101 of the body component 100 in the pre-fixation state and in the fixed state of the assembly 1.

In this context, it is advantageous in particular that the housing region 9 is preferably designed to be elastically deformable at least regionally in the insertion direction, in particular in such a way that, when the in particular wedge-shaped or ramp-shaped clamping region 8 is twisted in, it is elastically deformed or deformable at least regionally or partially due to the leverage effect exerted thereby.

These elastically deformable regions of the housing region 9 of the base body 6 of the connecting element 3 are realized in FIG. 26 and in FIG. 27 by the provision of corresponding window regions and recesses in the housing region 9. Of course, other embodiments can also be considered here.

As stated, the fastening assembly 1 according to the invention is characterized in particular by the fact that, during the mounting of the fastening assembly 1 on a body component 100, the retaining element 4, in particular the retaining region 7 of the retaining element 4, is twisted relative to the connecting element 3, enabling the passage of the retaining region 7 of the retaining element 4 through the fastening opening 101 of the body component 100 in the first place.

After the retaining region 7 of the retaining element 4 has passed through the fastening opening 101, the retaining region 7 of the retaining element 4 springs back again.

A further twisting of the retaining region 7 relative to the connecting element 3 then serves, under exertion of a leverage effect, so that the retaining element 4 is tensed relative to the connecting element 3 and the body component received between the retaining element 4 and the connecting element 3.

In order to be able to cause this desired rotational movement of the retaining element 4, in particular the retaining region 7 of the retaining element 4, relative to the connecting element 3 upon mounting of the assembly 1, the retaining region 7 of the retaining element 4 is preferably designed to be slightly conical and tapering in the insertion direction, wherein the retaining region 7 of the retaining element 4 preferably comprises a plurality of in particular outer-peripheral guiding surfaces 12, which are configured in order to generate a torque for twisting the retaining region 7 out of its base state when transferring the assembly 1 from its pre-assembly or delivery state into its pre-fixation state and when the retaining region 7 is inserted into the fastening opening 101 of the body component 100 in the insertion direction relative to the body component 100.

As indicated in the drawings, the outer-peripheral guiding surfaces 12 of the retaining region 7 are preferably designed in a helical fashion in order to generate a corresponding torque when the retaining region 7 is inserted into the fastening opening 101, in order to rotate the retaining region 7.

Figure 7:
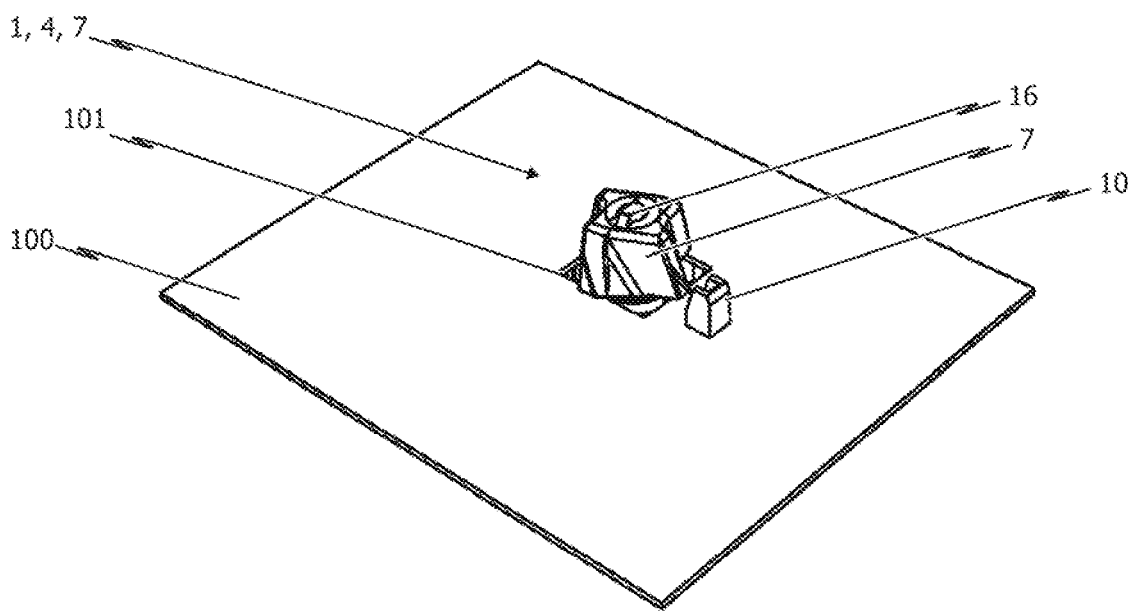
FIG. 7 schematically and in an isometric view, the assembly according to FIG. 6 from the rear (B-side)
Figure 10:
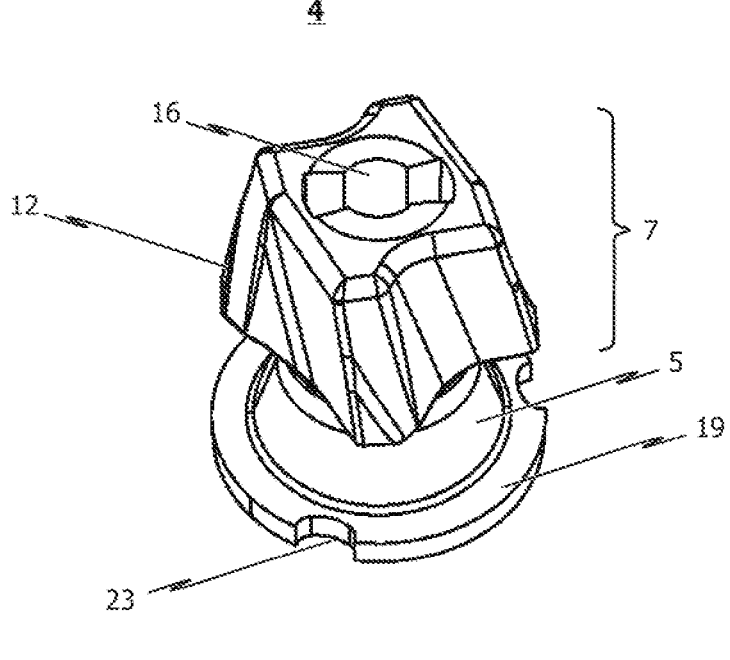
FIG. 10 schematically and in a first isometric view, an exemplary embodiment of a retaining element of the assembly according to the invention.

In particular, it can be seen from the illustration in FIG. 7 that the connecting element 3 preferably comprises at least one alignment means 10 in the form of a protruding region, which serves to align the connecting element 3, and in particular the base body 6 of the connecting element 3, relative to the fastening opening 101 and to position it accordingly. The alignment means 10 of the connecting element 3 is in particular guided through a corresponding (further) opening in the body component 100 and thus serves to pre-fix/pre-position the base body 6 of the connecting element 3.

As can be seen in the views in FIGS. 16A and 16B, the retaining region 7 of the retaining element 4 preferably has a geometry, in particular cross-sectional geometry, and/or size, that is adjusted with respect to the fastening opening 101 of the body component 100 such that, in the state of being aligned with respect to the fastening opening 101 of the body component 100, the retaining region 7 of the retaining element 4 is only insertable in its state of being twisted out of the base state through the fastening opening 101 of the body component 100.

According to embodiments of the fastening assembly 1 according to the invention, it is provided that it further comprises a locking and/or blocking element 13, which is also preferably formed from a plastic material, in particular in the course of a plastic injection-molding process.

The locking and/or blocking element 13 serves in particular to determine a position of the retaining element 4 relative to the connecting element 3.

For example, as can be seen in the illustrations in FIG. 12 and FIG. 13, the locking and/or blocking element 13 according to embodiments of the invention comprises a torsion element 14, which can be embodied in the form of a torsion spring element, for example.

The torsion element 14 interacts with the retaining region 7 of the retaining element 4 at least in the pre-assembly or delivery state of the assembly 1 such that, when the assembly 1 is transferred from its pre-assembly or delivery state into its pre-fixation state, said torsion element is elastically twisted about its longitudinal axis due to the twisting of the retaining region 7 relative to the fastening opening 101 of the body component 100. The torsion element 14 thereby generates the necessary return force, which serves to transfer the retaining region 7 of the retaining element 4 back into its second rotational position when the assembly 1 has been transferred from the pre-assembly or delivery state into the pre-fixation state.

Figure 11:
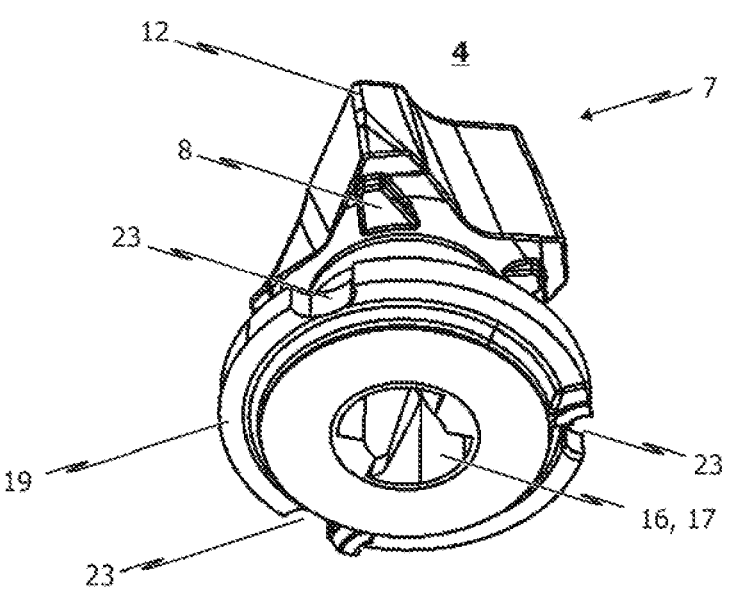
FIG. 11 schematically and in a second isometric view, the exemplary embodiment of the retaining element according to FIG. 10.

According to embodiments of the assembly 1 according to the invention, it is specifically provided that the base body 5 of the retaining element 4 comprises a passage 16 extending in the longitudinal direction of the base body 5 or a recess 16 extending in the longitudinal direction of the base body 5, as can be seen in particular in the illustration in FIG. 11. In this passage 16 or recess 16, the torsion element 14 of the locking and/or blocking element 13 is received at least regionally.

The illustration in FIG. 11 further shows that, on an inner peripheral surface of the passage 16 extending in the longitudinal direction of the base body 5 of the retaining element 4 or recess 16 extending in the longitudinal direction of the base body 5, at least one helical groove 17 can preferably be formed, with which, at least in the pre-assembly or delivery state of the assembly 1, at least one region of the torsion element 14, in particular a sliding block region 18 of the torsion element 14, engages.

Here, the assembly 1 is transferable from its pre-fixation state into the fixed state, in which the retaining region 7 of the retaining element 4 inserted through the fastening opening 101 of the body component 100 exerts a force, which acts on the edge region of the body component 100 surrounding the fastening opening 101 at least regionally counter to the insertion direction, in order to fix the connecting element 3 to the body component 100.

When transferring the assembly 1 from its pre-fixation state into its fixed state, as well as in the fixed state of the assembly 1, the engagement of the torsion element 14, in particular the sliding block region 18 of the torsion element 14, with the at least one in particular helical groove 17 of the base body 5 of the retaining element 4 is suspended. In this regard, we refer to the illustrations in FIG. 20 and FIG. 23, in particular.

Figure 23:
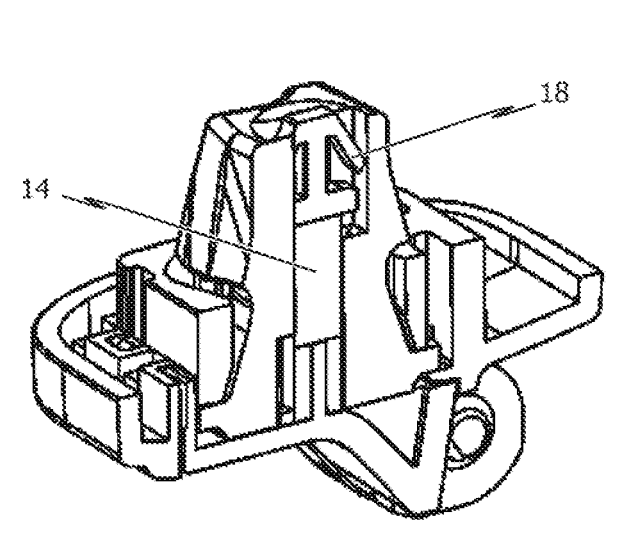
FIG. 23 schematically, a first sectional view of the assembly according to FIG. 22.
Figure 24:
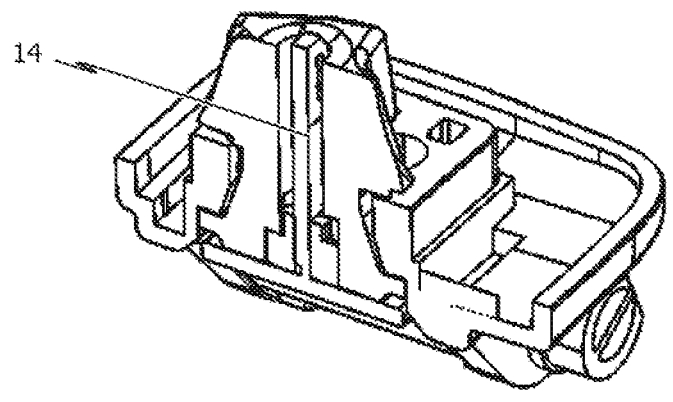
FIG. 24 schematically, a second sectional view of the assembly according to FIG. 22.
Figure 25:
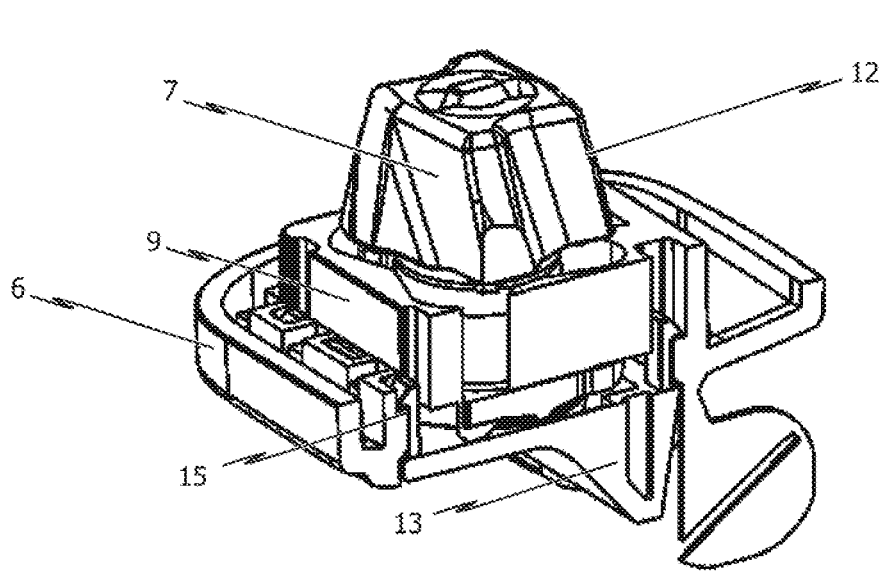
FIG. 25 schematically, a third sectional view of the assembly according to FIG. 22.

As can be seen in particular from the views in FIG. 19 to FIG. 21 on the one hand and the view in FIG. 23 on the other hand, according to embodiments of the invention, the locking and/or blocking element 13 can be transferred from a first state, in which the assembly 1 is in its pre-assembly or delivery state, into a state in which the assembly 1 is in its fixed state.

Here, it is provided that, in the first state of the locking and/or blocking element 13, it blocks a transfer of the retaining element 4 from the second rotational position into the first rotational position, wherein, upon transfer of the locking and/or blocking element 13 into its second state, in particular, the engagement of the torsion element 14 or the sliding block region 18 of the torsion element 14 with the helical groove 17 of the retaining element 4 is released and the retaining element 4 is twisted from its second rotational position into its fourth rotational position.

In particular, the illustrations in FIG. 12 and FIG. 13 show that the locking and/or blocking element 13 can comprise latching means 15 for preferably releasably latching the locking and/or blocking element 13 at least in its second state.

The latching is preferably carried out in the base body 6 of the connecting element 3, as shown in the views in FIGS. 14B, 15B, 16B, 17B, and 18B.

At least in the fixed state of the assembly, the retaining element is connected to the connecting element 3 via a total of at least four regions. This allows an in particular good and even force distribution.

With regard to the interlocking and/or blocking element 13, various embodiments are possible.

Figure 29:
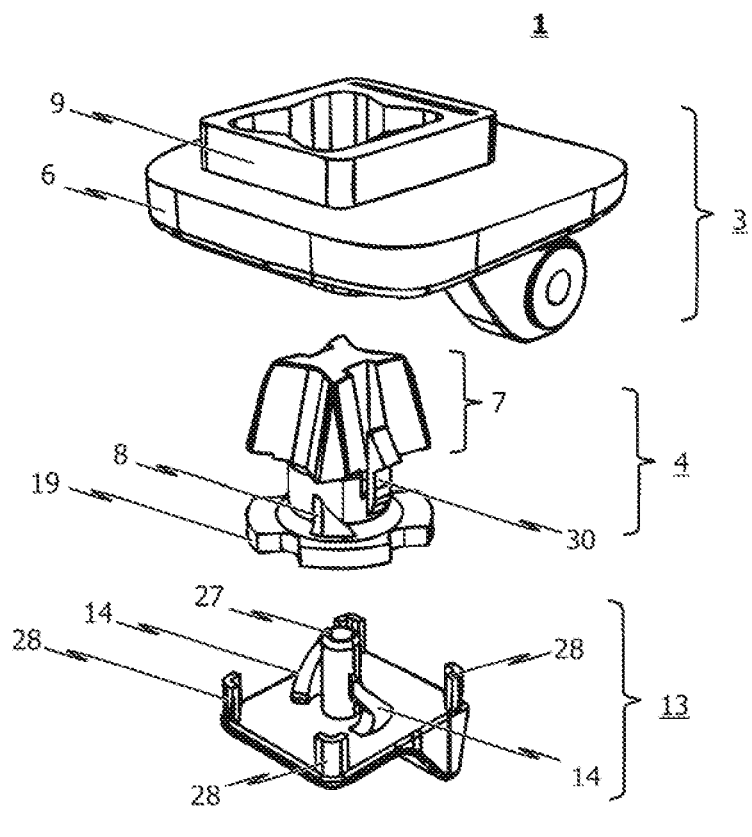
FIG. 29 schematically and in an isometric exploded view, an embodiment of the assembly according to the invention.
Figure 30:
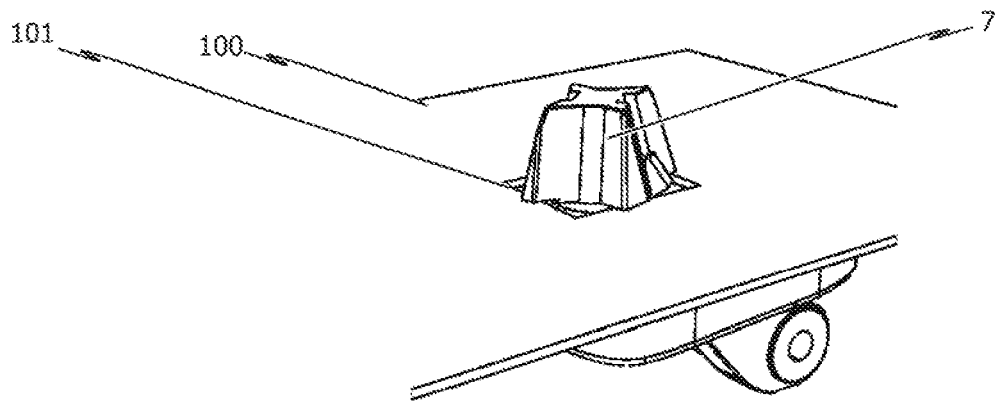
FIG. 30 schematically and in an isometric view, the assembly according to FIG. 29 in its fixed state.
Figure 31A:
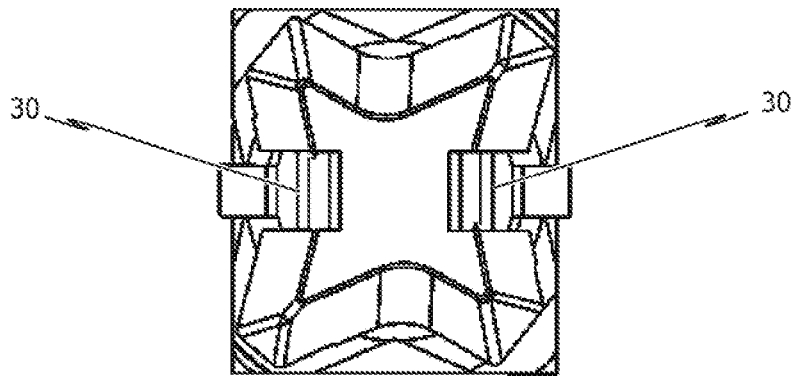
FIG. 31A schematically, a top plan view of the assembly according to FIG. 29, wherein the assembly is in its pre-assembly or delivery state.
Figure 31B:
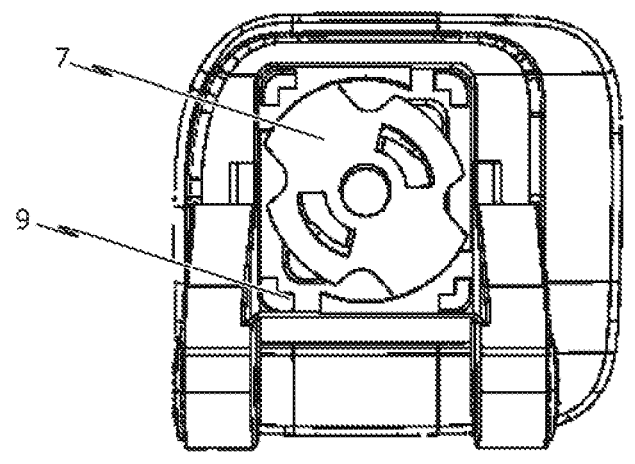
FIG. 31B schematically and rotated about 180°, the assembly according to FIG. 31A.
Figure 32A:
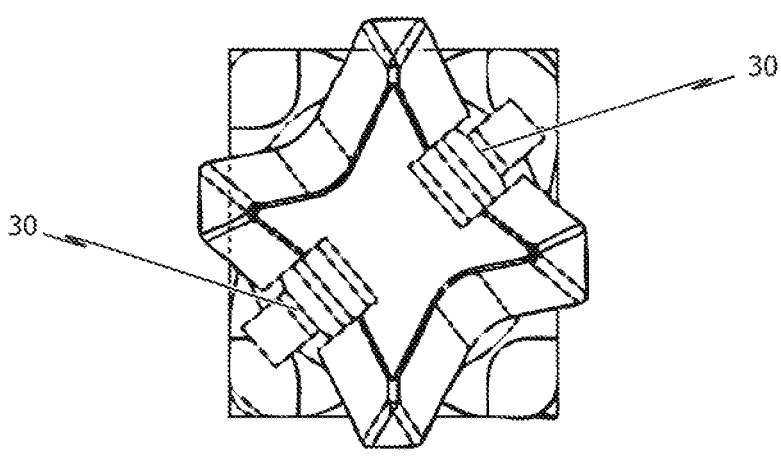
FIG. 32A schematically and in a top plan view, the assembly according to FIG. 29, wherein the assembly is in its fixed state.
Figure 32B:
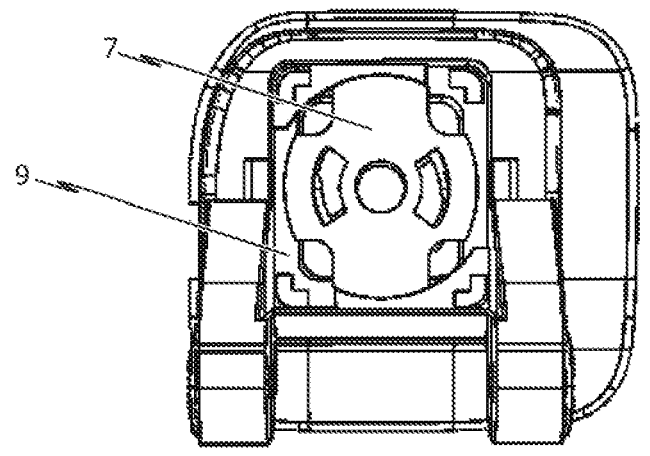
FIG. 32B schematically and rotated about 180°, the assembly according to FIG. 32A.
Figure 33:
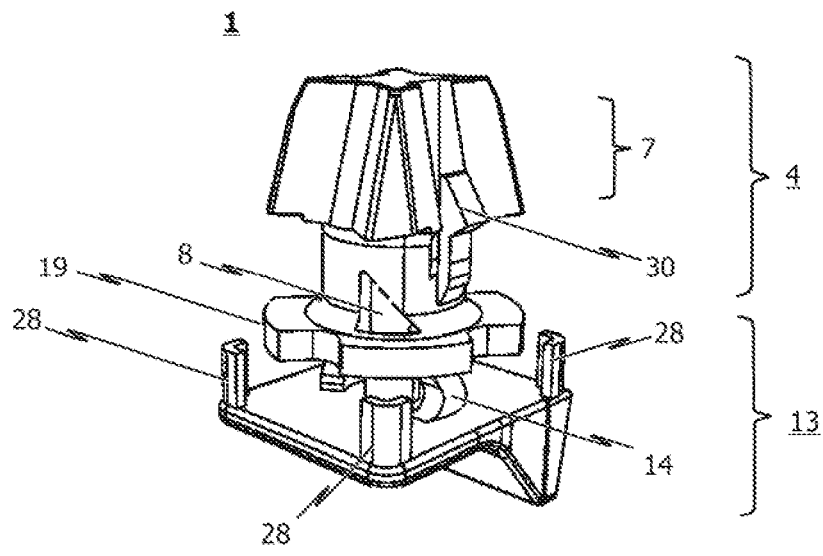
FIG. 33 schematically and in an isometric view, the assembly according to FIG. 29, but without the connecting element, wherein the assembly is in its pre-assembly or delivery state.
Figure 34:
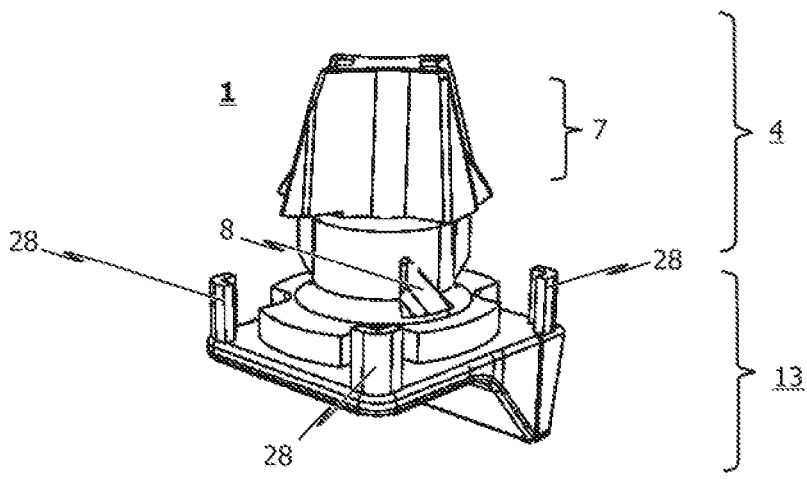
FIG. 34 schematically and in an isometric view, the assembly according to FIG. 29, but without the connecting element, wherein the assembly is in its fixed state.
Figure 35:
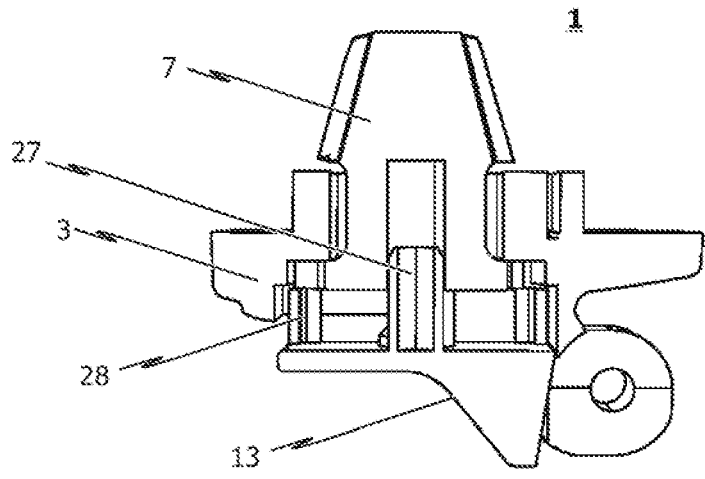
FIG. 35 schematically, a sectional view of the assembly according to FIG. 33, but with the connecting element.
Figure 36:
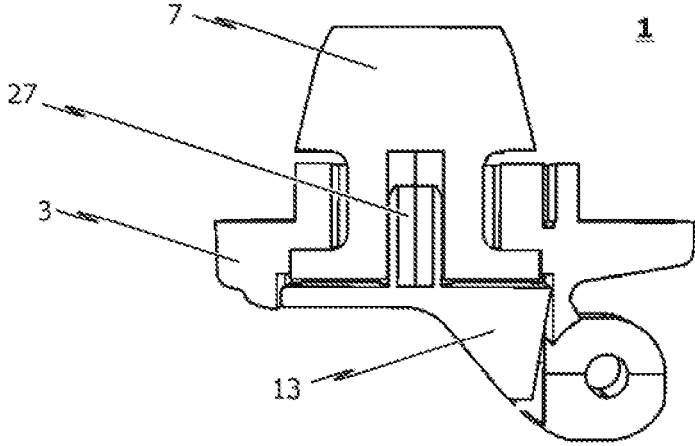
FIG. 36 schematically, a sectional view of the assembly according to FIG. 34, but with the connecting element.

An alternative embodiment of the locking and/or blocking element 13 is shown in FIG. 29. Here, the locking and/or blocking element 13 comprises an in particular rod-shaped guiding element 27, which is receivable in a guided manner in the corresponding recess 16 or in the corresponding passage 16 of the retaining element 4.

At least one and preferably a plurality of (for example two) helical torsion elements 14 are used, which are generate a torque due to their helical shape alone, i.e. without engaging with a corresponding helical groove on the retaining element 4.

The locking and/or blocking element 13 of the assembly shown in FIG. 29 has blocking ridges 28, which can interact with corresponding recesses on the crown region 19 of the base body 5 of the retaining element 4 in order to block a twisting of the base body 5 relative to the locking and/or blocking element 13.

Figure 37:
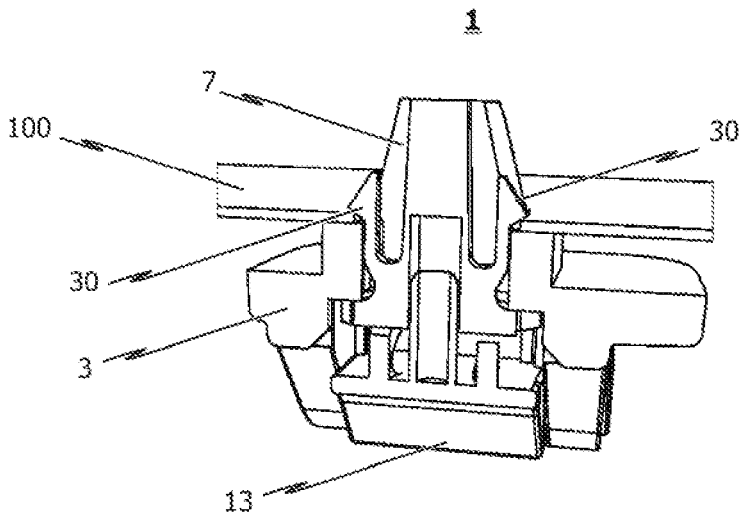
FIG. 37 schematically and in a sectional view, the assembly according to FIG. 35 in a state of being inserted in a fastening opening of the body component.
Figure 38:
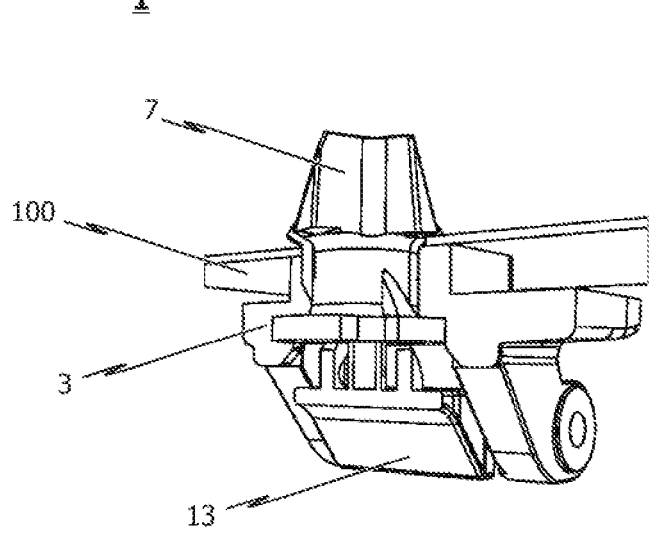
FIG. 38 schematically and in an isometric view from the bottom, the assembly according to FIG. 37, wherein the assembly is in its fixed state.

Furthermore, in the assembly 1 according to FIG. 29, latching means or clips 30 are arranged on the retaining element 4 in order to enable a latching of the assembly 1 in or on the fastening opening 101 in the pre-fixation state of the assembly 1 (cf. FIG. 37).

Further, it can be seen in the illustration in FIG. 29, for example, that the retaining element 4 can be equipped with helical clamping regions 8 in order to achieve a biasing of the assembly 1 in at least the fixed state of the assembly 1 in the Z direction.

After mounting of the fastening assembly 1, it can be released from the fixed state by manipulation with a tool, in particular with a screwdriver. For this purpose, for example, an opening 22 can be formed in the housing region 9 of the base body 6 of the connecting element 3, through which tool can be guided in order to release the fixed state of the assembly 1.

The invention is not limited to the embodiments specifically shown in the drawings, but rather arises from a consideration of all features described in connection with the torsion fastening clip according to the invention.

LIST OF REFERENCE NUMERALS

1 Assembly
2 Vehicle component
3 Connecting element
4 Retaining element
5 Base body of the retaining element
6 Base body of the connecting element
7 Retaining region of the retaining element
8 Wedge-shaped or ramp-shaped clamping region of the retaining element
9 Housing region of the base body of the connecting element
10 Alignment means of the connecting element
11 Receptacle opening of the base body of the connecting element
12 Guiding surface of the retaining region
13 Locking and/or blocking element

14 Torsion element of the locking and/or blocking element
15 Latching means of the locking and/or blocking element
16 Passage/recess in the base body of the retaining element
17 Helical groove in the passage/recess in the base body of the retaining element
18 Sliding block region of the torsion element
19 Crown region on the base body of the retaining element
20 Support surface on the base body of the connecting element
21 Receptacle for the latching means of the torsion element of the locking and/or blocking element 13
22 Opening for screwdriver
23 Recess
24 Base body/plate
25 Guiding means
26 Protruding region
27 Guiding element
28 Blocking ridge
30 Latching means/clip
100 Body component
101 Fastening opening in the body component

The invention claimed is:

1. An assembly for providing a fastening possibility for a vehicle component to a body component, wherein the assembly is configured as a torsion clip and comprises:
   a connecting element to which the vehicle component is connectable; and
   a retaining element for retaining the connecting element on the body component,
   wherein the retaining element comprises a base body with a retaining region at a first end region of the base body, and the connecting element comprises a base body with a receptacle opening in which the retaining element is at least regionally receivable or through which the retaining region of the retaining element is transferable from a pre-assembly or delivery state, in which the retaining region of the retaining element is not yet inserted through a fastening opening in the body component, into a pre-fixation state, in which the retaining region of the retaining element is inserted through the fastening opening of the body component and an edge region of the body component surrounding the fastening opening is received at least regionally between the retaining region of the retaining element and the base body of the connecting element,
   wherein, in order to transfer the assembly from the pre-assembly or delivery state into the pre-fixation state, a torque is exerted on at least the retaining region of the retaining element in such a way that, starting from a base state of the retaining region, at least the retaining region of the retaining element is twisted relative to the connecting element and relative to the fastening opening of the body component in order to allow a passage of the retaining region through the fastening opening of the body component, wherein, after the passage of the retaining element or retaining region of the retaining element through the fastening opening of the body component, the torque previously exerted on the retaining region is at least partially lifted and the retaining region is again in the base state.

2. The assembly as claimed in claim 1,
   wherein the retaining element or retaining region of the retaining element is twistable relative to the connecting element about a rotational axis extending in the insertion direction of the retaining element, namely:

from a first rotational position of the retaining element or retaining region of the retaining element, in which the retaining element is connectable to the connecting element for putting together the assembly, into a second rotational position of the retaining element or retaining region of the retaining element, in which the retaining element is connected to the connecting element and the assembly is in the pre-assembly or delivery state or in the pre-fixation state; and from the second rotational position of the retaining element or retaining region of the retaining element into a third rotational position of the retaining element or retaining region of the retaining element, in which the retaining element is located when the retaining region passes through the fastening opening of the body component.

3. The assembly as claimed in claim 2, wherein the assembly is further transferable from the pre-fixation state into a fixed state, in which the retaining region of the retaining element inserted through the fastening opening of the body component exerts a force, which acts on the edge region of the body component surrounding the fastening opening at least regionally counter to the insertion direction, in order to fix the connecting element to the body component.

4. The assembly as claimed in claim 3, wherein, in order to transfer the assembly from the pre-fixation state into a fixed state, the retaining element or retaining region of the retaining element is further twisted from the second rotational position relative to the connecting element into a fourth rotational position.

5. The assembly as claimed in claim 4, wherein the retaining region of the retaining element and/or at least one helical clamping region, which, when the assembly is transferred into the fixed state, in which the retaining element is twisted from the second rotational position into the fourth rotational position, is rotated into a gap-shaped region between the retaining region of the retaining element, and the edge region of the body component surrounding the fastening opening of the body component, exertion of a leverage effect.

6. The assembly as claimed in claim 5, wherein the base body of the connecting element comprises a housing region adapted at least regionally to the size and/or geometry of the fastening opening of the body component, which housing region is received at least regionally in the fastening opening of the body component in the pre-fixation state and in the fixed state of the assembly, wherein the housing region is designed to be elastically deformable at least regionally in the insertion direction, in such a way that, when the wedge-shaped or ramp-shaped clamping region is twisted in, it is elastically deformed or deformable at least regionally or partially due to the leverage effect exerted thereby.

7. The assembly as claimed in claim 1, wherein the connecting element comprises alignment means for aligning the connecting element and the retaining element inserted into the receptacle opening of the base body of the connecting element relative to the fastening opening of the body component, and/or wherein the retaining region of the retaining element has a geometry and/or size, that is adjusted with respect to the fastening opening of the body component such that, in the state of being aligned with respect to the fastening opening of the body component, the retaining region of the retaining element is only insertable in the state of being twisted out of the base state through the fastening opening of the body component, and/or wherein the retaining region of the retaining element comprises at least one outer-peripheral guiding surface, which is configured in order to generate a torque for twisting the retaining region out of the base state when transferring the assembly from the pre-assembly or delivery state into the pre-fixation state and when the retaining region is inserted into the fastening opening of the body component in the insertion direction relative to the body component.

8. The assembly as claimed in claim 4, wherein the assembly further comprises:

a locking and/or blocking element, for establishing a position of the retaining element relative to the connecting element, wherein the locking and/or blocking element comprises a torsion element, in the form of a torsion spring element, which interacts with the retaining region of the retaining element at least in the pre-assembly or delivery state of the assembly such that, when the assembly is transferred from the pre-assembly or delivery state into the pre-fixation state, said torsion element is elastically twisted about a longitudinal axis due to the twisting of the retaining region relative to the fastening opening of the body component.

9. The assembly as claimed in claim 8, wherein the base body of the retaining element comprises a passage extending in the longitudinal direction of the base body or a recess extending in the longitudinal direction of the base body, in which the torsion element of the locking and/or blocking element is received at least regionally, wherein, on an inner peripheral surface of the passage extending in the longitudinal direction of the base body or recess extending in the longitudinal direction of the base body, at least one helical groove is formed, with which, at least in the pre-assembly or delivery state of the assembly, at least one region of the torsion element engages.

10. The assembly as claimed in claim 9, wherein the assembly is transferable from the pre-fixation state into a fixed state, in which the retaining region of the retaining element inserted through the fastening opening of the body component exerts a force, which acts on the edge region of the body component surrounding the fastening opening at least regionally counter to the insertion direction in order to fix the connecting element to the body component, wherein, when transferring the assembly from the pre-fixation state into the fixed state as well as in the fixed state of the assembly, the engagement of the torsion element with the at least one helical groove of the base body of the retaining element is suspended.

11. The assembly as claimed in claim 8, wherein the locking and/or blocking element is transferable from a first state, in which the assembly is in the pre-assembly or delivery state, into a second state, in which the assembly is in the fixed state, wherein, in the first state of the locking and/or blocking element, it blocks a transfer of the retaining element from the second rotational position into the first rotational position, and wherein, upon transfer of the locking and/or blocking element into the second state, the engagement of the torsion element with the helical groove of the retaining element is released and the retaining element is twisted from the second rotational position into the fourth rotational position, wherein the locking and/or blocking element comprises at least one latching means for releasably latching the locking and/or blocking element at least in the second state.

12. The assembly as claimed in claim 11, wherein the assembly comprises at least one element configured in order to, when the locking and/or blocking element is transferred from the first state into the second state, translate a linear movement of the locking and/or blocking element relative to the connecting element into a rotational movement of the retaining element relative to the connecting element in order to transfer the retaining element into the fourth rotational position.

13. The assembly as claimed in claim 2, wherein the base body of the retaining element is arranged at least regionally in a rotationally symmetrical manner, wherein a crown region, designed to be at least regionally annular, is formed at a second end region of the base body lying opposite the first end region, and wherein a fitted region is formed between the crown region and the retaining region, wherein the base body of the connecting element comprises a support surface adapted at least regionally to the geometry and/or size of the crown region in such a way that, at least in the pre-assembly or delivery state of the assembly and further in the pre-fixation state of the assembly, the crown region of the retaining element rests at least regionally on the support surface of the connecting element.

14. The assembly as claimed in claim 13, wherein at least one recess is formed in the crown region of the retaining element, and wherein the connecting element comprises a region designed to be at least regionally complementary to the at least one recess of the crown region and protruding in the direction of the receptacle opening of the connecting element, which region is configured such that, in the first rotational position of the retaining element and only in the first rotational position of the retaining element, the retaining element is connectable to the connecting element in such a way that the crown region of the retaining element at least regionally rests on the support surface of the connecting element, wherein the at least one region protruding in the direction of the receptacle opening of the connecting element is arranged offset from the plane in which the crown region of the retaining element lies in such a way that the at least one region protruding in the direction of the receptacle opening of the connecting element blocks a release of the connection between the retaining element and the connecting element in the second rotational position of the retaining element.

15. The assembly as claimed in claim 1, characterized in that the retaining element comprises a base body with a retaining region at a first end region of the base body, and the connecting element comprises a base body with a receptacle opening through which the retaining region of the retaining element, is insertable at least regionally, and/or wherein the assembly is transferable from a pre-assembly state, in which the retaining region of the retaining element is insertable or inserted through a fastening opening in the body component, into a fixed state, in which the retaining region of the retaining element inserted through the fastening opening of the body component exerts a force, which acts on the edge region of the body component surrounding the fastening opening at least regionally counter to the insertion direction in order to fix the connecting element to the body component, and/or wherein the assembly further comprises a locking and/or blocking element, for establishing a position of the retaining element relative to the connecting element, wherein the locking and/or blocking element is transferable from a first state, in which the assembly is in the pre-assembly state, into a second state, in which the assembly is in the fixed state;

wherein the assembly comprises at least one element configured in order to, when the locking and/or blocking element is transferred from the first state into the second state, translate a linear movement of the locking and/or blocking element relative to the connecting element into a rotational movement of the retaining element relative to the connecting element in order to transfer the assembly into the fixed state.

* * * * *